United States Patent
Hoshida

(10) Patent No.: US 9,281,937 B2
(45) Date of Patent: Mar. 8, 2016

(54) CONTROL TIMING SYNCHRONIZATION METHOD, OPTICAL TRANSMISSION SYSTEM, AND OPTICAL TRANSMISSION APPARATUS

(71) Applicant: FUJITSU LIMITED, Kawasaki-shi, Kanagawa (JP)

(72) Inventor: Takeshi Hoshida, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 101 days.

(21) Appl. No.: 14/166,186

(22) Filed: Jan. 28, 2014

(65) Prior Publication Data

US 2014/0270804 A1  Sep. 18, 2014

(30) Foreign Application Priority Data

Mar. 15, 2013  (JP) ................................ 2013-053409

(51) Int. Cl.
| | |
|---|---|
| *H04B 10/00* | (2013.01) |
| *H04L 7/00* | (2006.01) |
| *H04B 10/299* | (2013.01) |
| *H04J 14/02* | (2006.01) |
| *H04B 10/077* | (2013.01) |
| *H04J 13/00* | (2011.01) |

(52) U.S. Cl.
CPC .......... *H04L 7/0075* (2013.01); *H04B 10/0777* (2013.01); *H04B 10/0779* (2013.01); *H04B 10/299* (2013.01); *H04J 14/0272* (2013.01); *H04B 2210/074* (2013.01); *H04J 2013/0096* (2013.01)

(58) Field of Classification Search
CPC ......... H04L 7/06; H04L 7/065; H04L 7/0075; H04L 7/10; H04B 10/299
See application file for complete search history.

(56) References Cited

U.S. PATENT DOCUMENTS

| | | | |
|---|---|---|---|
| 5,621,895 A | * | 4/1997 | Weis et al. .................... 370/407 |
| 7,580,632 B1 | * | 8/2009 | Feuer et al. ..................... 398/32 |
| 2009/0031035 A1 | * | 1/2009 | Dharmaraju et al. .......... 709/230 |
| 2012/0014695 A1 | * | 1/2012 | Feuer et al. ..................... 398/65 |
| 2012/0141130 A1 | * | 6/2012 | Nakashima et al. ............ 398/82 |

OTHER PUBLICATIONS

Sone et al.,"First Demonstration of Hitless Spectrum Defragmentation using Real-time Coherent Receivers in Flexible Grid Optical Networks", ECOC Postdeadline Papers, Sep. 19, 2012.

(Continued)

*Primary Examiner* — Li Liu
(74) *Attorney, Agent, or Firm* — Staas & Halsey LLP

(57) ABSTRACT

A control timing synchronization method is executed by a first and a second optical transmission apparatus. The first optical transmission apparatus: superimposes on a main signal and transmits, information of control process details; waits for a first period; subsequently, superimposes on the main signal and transmits, a message giving notification of control start timing; waits for a second period; and subsequently switches a process of the first optical transmission apparatus to a process corresponding to the control process details. The second optical transmission apparatus: acquires the information on the main signal; waits until detection of the message on the main signal, when a process is present that is to be executed by the second optical transmission apparatus based on the information; waits for the second period when the message is detected while waiting for the detection of the message; and subsequently, executes a process corresponding to the information.

16 Claims, 12 Drawing Sheets

(56) References Cited

OTHER PUBLICATIONS

Fred Heismann, et al., "Signal Tracking and Performance Monitoring in Multi-Wavelength Optical Networks", 22nd European Conference on Optical Communication—ECOC'96, 1996, p. 3.47-3.50.

Takahito Tanimura, et al., "Superimposition and Detection of Frequency Modulated Tone for Light Path Tracing Employing Digital Signal Processing and Optical Filter", Optical Fiber Communication Conference and Exposition (OFC) and the National Fiber Optic Engineers Conference (NFOEC), Mar. 4, 2012.

H. Takeshita, et al., "Study for signal format independent and degradation-free optical path identifier based on SOP modulation for multi-degree CDC-ROADM systems", 2012 IEICE, Mar. 20, 2012, p. 436.

M. Bouda, et al., "OIF-PMQ-TX-01.0—Implementation Agreement for Integrated Polarization Multiplexed Quadrature Modulated Transmitters", Mar. 12, 2010.

A. J. Ticknor, et al., "OIF-DPC-RX-01.1—Implementation Agreement for Integrated Dual Polarization Intradyne Coherent Receivers", Sep. 20, 2011.

\* cited by examiner

CONTROL TIMING SYNCHRONIZATION METHOD, OPTICAL TRANSMISSION SYSTEM, AND OPTICAL TRANSMISSION APPARATUS

CROSS REFERENCE TO RELATED APPLICATIONS

This application is based upon and claims the benefit of priority of the prior Japanese Patent Application No. 2013-053409, filed on Mar. 15, 2013, the entire contents of which are incorporated herein by reference.

FIELD

The embodiments discussed herein are related to a control timing synchronization method, an optical transmission system, and an optical transmission apparatus.

BACKGROUND

Operation of a photonic network may include changing the signal wavelength assigned to a wavelength path, switching the modulation/demodulation mode, a nonlinear compensation mode, or an error correction (forward error correction; FEC) mode, and reallocating network resources. Since the photonic network is in operation, such switching and reallocation are desirably performed with minimal downtime. Therefore, the timing of switching respective processes must be synchronized at the transmitting end, relay nodes, and the receiving end.

According to a conventional scheme, a control signal channel is assigned to a wavelength that is beyond the wavelength band assigned to a main signal channel and, by wavelength multiplexing and transmitting the main signal channel and the control signal channel from the transmitting end, the relay node and the receiving end are notified of the control timing. According to another scheme, for example, as in the case of Synchronous Digital Hierarchy (SDH) and an Optical Transport Network (OTN), if overhead exists that is included in a digital frame structure for signal transfer of the main signal, this is used for giving notification of the control timing.

According to some schemes, to manage and control a network, for example, the intensity, the frequency, or the polarization state of an optical signal is modulated to superimpose a control signal on a main signal for transmission (for example, refer to U.S. Pat. No. 7,580,632; US Patent Publication Nos. 2012/0014695 and 2012/0141130; Heismann, Fred, et al, "Signal Tracking and Performance Monitoring In Multi-Wavelength Optical Networks", 22nd European Conference on Optical Communication—ECOC '96, 1996, pp. 3.47-3.50; Tanimura, Takahito, et al, "Superimposition and Detection of Frequency Modulated Tone for Light Path Tracing Employing Digital Signal Processing and Optical Filter", Optical Fiber Communication Conference and Exposition (OFC) and the National Fiber Optic Engineers Conference (NFOEC) 2012, (USA), Mar. 4, 2012; and Takeshita, Hitoshi, et al, "Study for signal format independent and degradation-free optical path identifier based on SOP modulation for multi-degree CDC-ROADM systems", 2012 Proceedings of the Institute of Electronics, Information and Communication Engineers (IEICE) CONFERENCE 2, (Japan), Mar. 20, 2012, p. 436).

However, in a convention scheme of giving notification of the control timing through wavelength multiplexing of a main signal channel and a control signal channel, separate transmitters and separate receivers are prepared for a main signal and a control signal and therefore, a difference may occur in length of the optical transmission path. Since wavelengths are different between the main signal channel and the control signal channel, a skew occurs between the main signal and the control signal consequent to wavelength dispersion of optical fibers. If the wavelength of the control signal channel is beyond the band of an optical amplifier such as an erbium doped fiber amplifier (EDFA), a relay node performs regenerative relaying accompanied by optoelectronic conversion and electrooptic conversion for an optical signal of the control signal channel and therefore, a relaying process of the control signal takes time. Consequent to these factors, the timing deviates or temporally varies when the main signal and the control signal transmitted from the transmitting end reach the relay node and the receiving end, causing a problem of increased error of the control timing between the transmitting end and the relay node/the receiving end.

On the other hand, in a conventional scheme of using an overhead byte of the main signal for giving notification of the control timing, the readout of the overhead byte is enabled after properly setting a modulation mode and a bit rate, and communicating the main signal. Therefore, problems arise in that a receiver for the main signal must be prepared in the relay node and a waiting time for the communication of the main signal is required.

SUMMARY

According to an aspect of an embodiment, a control timing synchronization method is executed by a first optical transmission apparatus that acts as a transmitting end in a wavelength path, and a second optical transmission apparatus that receives in the wavelength path, an optical signal from the first optical transmission apparatus. The control timing synchronization method includes the first optical transmission apparatus superimposing on a main signal and transmitting, information for giving notification of control process details; waiting for a first period after transmitting the information; superimposing on the main signal and transmitting after waiting for the first period, a message for giving notification of control start timing; waiting for a second period after transmitting the message; and switching after waiting for the second period, a process of the first optical transmission apparatus to a process corresponding to the control process details; and the second optical transmission apparatus acquiring the information superimposed on the main signal and transmitted from the first optical transmission apparatus; waiting until detection of the message superimposed on the main signal and transmitted from the first optical transmission apparatus, when a process is present that is to be executed by the second optical transmission apparatus based on the information; waiting for the second period when the message is detected while waiting for the detection of the message; and executing after waiting for the second period, a process corresponding to the information.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

Figure 1:
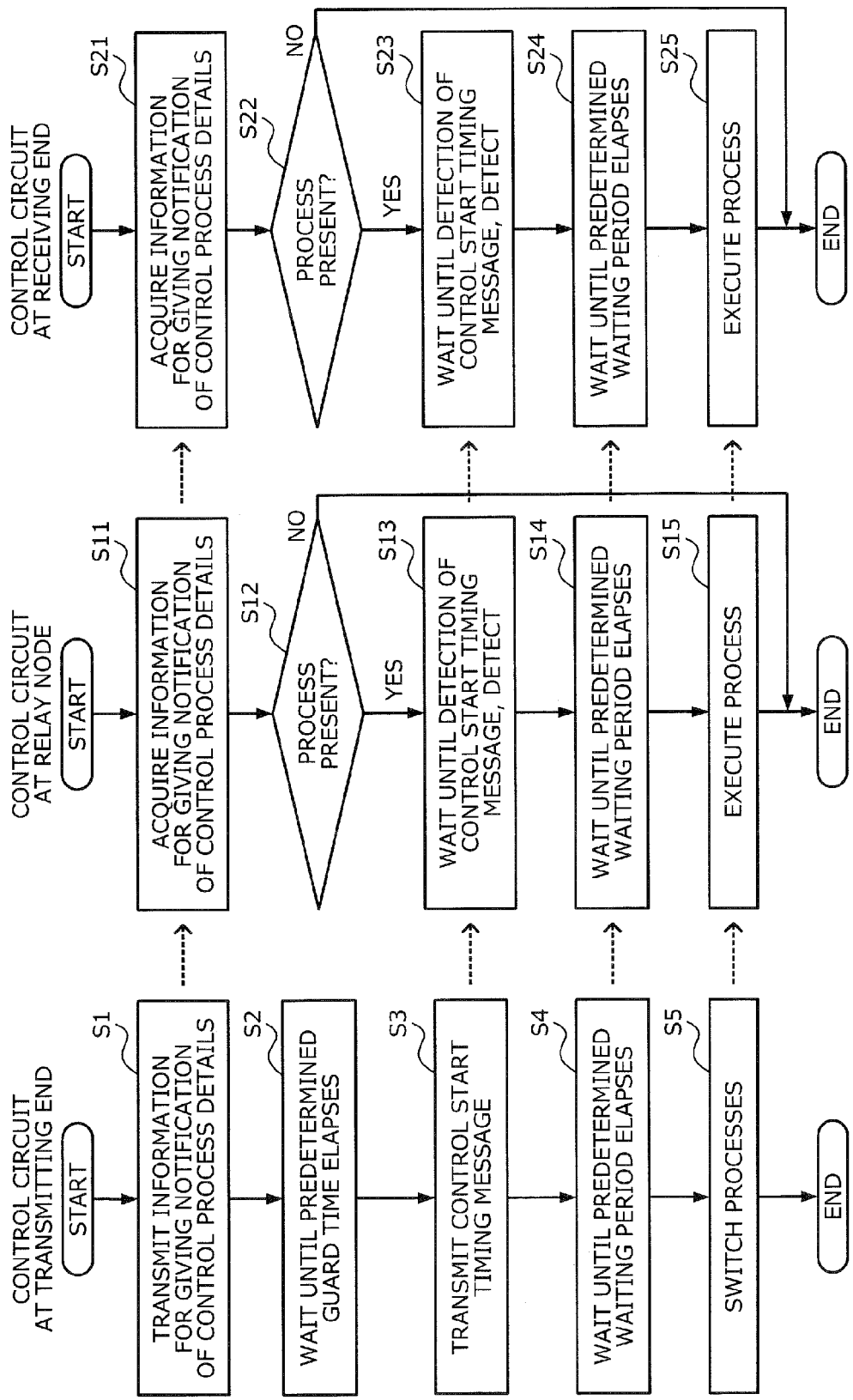
FIG. 1 is a diagram of a first example of a control timing synchronization method according to an embodiment.

Embodiments of a control timing synchronization method, an optical transmission system, and an optical transmission apparatus will be described in detail with reference to the accompanying drawings. In the description of the embodiments, identical components are given the same reference numerals, and redundant description thereof is omitted.

FIG. 1 is a diagram of a first example of a control timing synchronization method according to an embodiment. The first example is an example of an optical transmission system in which respective control circuits at a transmitting end, a relay node, and a receiving end of a given wavelength path have system clocks that are not synchronized with one another.

In FIG. 1, a flowchart on the left side represents a process of the control circuit at the transmitting end, a flowchart in the center represents a process of the control circuit at the relay node, and a flowchart on the right side represents a process of the control circuit at the receiving end. Dotted-lined arrows between the flowcharts indicate temporal correlations.

When a process switching command is input to a given wavelength path for a process such as switching the modulation mode, the transmission wavelength, the error correction mode of a main signal, or the bit rate of the main signal and executing an operation of starting or restarting a scrambler of each node, the process depicted in FIG. 1 is started. The process switching command may be input by an operator of the optical transmission system or from a network, for example.

When the process depicted in FIG. 1 is started, first, the control circuit at the transmitting end performs control of superimposing on a main signal and transmitting information for giving notification of control process details corresponding to the input process switching command (step S1). As a result, an optical signal having the main signal superimposed with the information for giving notification of control process details is transmitted from the transmitting end by a packet transfer scheme, for example. The information for giving notification of control process details may be information indicating that a transmission wavelength is set to 0000 nm, for example. An arbitrary numeric character is denoted by o.

Upon transmission of the optical signal at step S1, the control circuit at the transmitting end waits until a predetermined guard time elapses (step S2). The predetermined guard time is an example of a first period and is a period of time sufficient for the relay node or the receiving end to determine at step S12 or step S22 described later, whether a process is present that is to be executed thereby.

When the predetermined guard time has elapsed, the control circuit at the transmitting end performs control of superimposing on the main signal and transmitting, a message for giving notification of control start timing (step S3). As a result, an optical signal having the main signal superimposed with the message for giving notification of control start timing is transmitted from the transmitting end. The message for giving notification of control start timing may be information indicating that switching of a process will be performed after ΔΔΔΔ seconds, for example. An arbitrary numeric character is denoted by Δ.

When the optical signal is transmitted at step S3, the control circuit at the transmitting end waits until a predetermined waiting period has elapsed (step S4). The predetermined waiting period is an example of a second period and may be a time of ΔΔ seconds specified by the message for giving notification of control start timing. The predetermined waiting period may be determined in advance or may be set on a case-by-case basis by the control circuit at the transmitting end according to the configuration and environment of the optical transmission system. If the predetermined waiting period is determined in advance, the message for giving notification of control start timing may be a simple pulse signal.

When the predetermined waiting period has elapsed, the control circuit at the transmitting end performs control of switching the process at the apparatus thereof to a process related to a signal process, the details of which correspond the control process details transmitted at step S1 (step S5) and terminates a sequence of the process according to the flowchart. At step S2 or step S4, the guard time or the waiting time may be measured by using a timer included at the transmitting end or by using time information provided from, for example, a time server of a network to which the transmitting end is connected.

At step S1 or step S3, the transmitting end may superimpose on the main signal, a control signal such as the information for giving notification of control process details or the message for giving notification of control start timing, by modulating the intensity, frequency, or polarization state of an optical signal according to the information or the message. In the following description, superimposing a control signal on the main signal by modulating characteristics such as the intensity, frequency, or polarization state of the optical signal may be referred to as superimposition modulation. Superimposing the control signal on the main signal by modulating characteristics such as the intensity, frequency, or polarization state of the optical signal may be referred to as intensity superimposition modulation, frequency superimposition modulation, or polarization superimposition modulation, as the case may be.

When receiving the optical signal transmitted from the transmitting end at step S1, the relay node demodulates the control signal superimposed on the main signal. The control circuit at the relay node acquires from the modulated control signal, the information for giving notification of control process details (step S11). The control circuit at the relay node then determines whether a process to be executed by the apparatus thereof is present, based on the information for giving notification of control process details (step S12). This determination is made while the control circuit at the transmitting end waits for the predetermined guard time to elapse at step S2.

If no such process is present (step S12: NO), the control circuit at the relay node terminates the process according to the flowchart. On the other hand, if a process to be executed is present (step S12: YES), the control circuit at the relay node waits until the relay node detects a message for giving notification of control start timing. The relay node detects the message for giving notification of control start timing by receiving the optical signal transmitted from the transmitting end at step S3 and demodulating the control signal superimposed on the main signal (step S13).

The control circuit at the relay node then waits until a predetermined waiting period elapses (step S14). The predetermined waiting period is an example of the second period and is the same period as the predetermined waiting period during which the transmitting end waits at step S4. When the predetermined waiting period has elapsed, the relay node performs control of executing a process corresponding to the control process details acquired at step S11 (step S15) and terminates a sequence of the process according to the flowchart. At step S14, the waiting time may be measured by using a timer included at the relay node or by using time information provided from, for example, a time server of a network to which the relay node is connected.

When receiving from the relay node, the optical signal transmitted from the transmitting end at step S1, for example, the receiving end demodulates the control signal superimposed on the main signal. The control circuit at the receiving end acquires from the modulated control signal, the information for giving notification of control process details (step S21). The control circuit at the receiving end then determines whether a process to be executed by the apparatus thereof is present, based on the information for giving notification of control process details (step S22). This determination is made while the control circuit at the transmitting end waits for the predetermined guard time to elapse at step S2.

If no such process is present (step S22: NO), the control circuit at the receiving end terminates the process according to the flowchart. On the other hand, if a process to be executed is present (step S22: YES), the control circuit at the receiving end waits until the receiving end detects a message for giving notification of control start timing. The receiving end detects the message for giving notification of control start timing by receiving from the relay node, the optical signal transmitted from the transmitting end at step S3, for example, and demodulating the control signal superimposed on the main signal (step S23).

The control circuit at the receiving end then waits until a predetermined waiting period elapses (step S24). The predetermined waiting period is an example of the second period and is the same period as the predetermined waiting period during which the transmitting end waits at step S4. When the predetermined waiting period has elapsed, the control circuit at the receiving end performs control of executing a process corresponding to the control process details acquired at step S21 (step S25) and terminates a sequence of the process according to the flowchart. At step S24, the waiting time may be measured by using a timer included at the receiving end or by using time information provided from, for example, a time server of a network to which the receiving end is connected.

It is assume that $\Delta T1$ denotes the time consumed for transmitting the optical signal from the transmitting end to the relay node and that $\Delta T2$ denotes the time consumed for transmitting the optical signal from the transmitting end via, for example, the relay node, to the receiving end.

After the control circuit at the transmitting end shifts to the state of waiting for the predetermined waiting period at step S4, the control circuit at the relay node shifts to the state of waiting for the predetermined waiting period with a delay of $\Delta T1$ and the control circuit at the receiving end shifts to the state of waiting for the predetermined waiting period with a delay of $\Delta T2$. Therefore, after the expiration of the predetermined waiting period at the transmitting end, the predetermined waiting period expires at the relay node with a delay of $\Delta T1$ and the predetermined waiting period expires at the receiving end with a delay of $\Delta T2$.

Therefore, after the transmitting end switches to the process related to signal processing, the details of which correspond to the control process details transmitted at step S1, the relay node executes the process corresponding to the control process details acquired at step S11, with a delay of $\Delta T1$. After the transmitting end switches to the process related to the signal processing corresponding to the control process details transmitted at step S1, the receiving end executes the process corresponding to the control process details acquired at step S21, with a delay of $\Delta T2$.

As described above, a deviation of $\Delta T1$ occurs between the transmitting end and the relay node, with the execution of the process corresponding to the control process details; and a deviation of $\Delta T2$ occurs between the transmitting end and the receiving end, with the execution of the process corresponding to the control process details. However, since the control signal is superimposed on the main signal by the intensity superimposition modulation, the frequency superimposition modulation, or the polarization superimposition modulation and is transmitted at the same wavelength through the same path as the main signal, no skew occurs between the main signal and the control signal consequent to wavelength dispersion of optical fibers. Since the control signal is amplified along with the main signal by an optical amplifier such as an EDFA, optoelectronic conversion nor electrooptic conversion needs be performed for the optical signal of the control signal at the relay node.

Therefore, an optical signal transmitted from the transmitting end immediately after the switch to the process corresponding to the control process details at the transmitting end reaches the relay node immediately after the execution of the process corresponding to the control process details at the relay node, causing no problem. Similarly, the optical signal transmitted from the transmitting end immediately after the switch to the process corresponding to the control process details at the transmitting end reaches the receiving end immediately after the execution of the process corresponding to the control process details at the receiving end, causing no problem.

According to the control timing synchronization method depicted in FIG. 1, after the process is switched at the transmitting end, the relay node is delayed by the time consumed for the optical signal to reach the relay node from the transmitting end before executing the process, and the receiving end is delayed by the time consumed for the optical signal to reach the receiving end from the transmitting end before executing the process. Therefore, the timings of switching processes at the transmitting end, the relay node, and the receiving end can be synchronized with consideration of the times consumed for the optical signal to reach the relay node and the receiving end from the transmitting end. As a result, since downtime of a given wavelength path in the optical transmission system can be ended in the predetermined waiting period at step S4 at the transmitting end, the downtime can be minimized.

Figure 2:
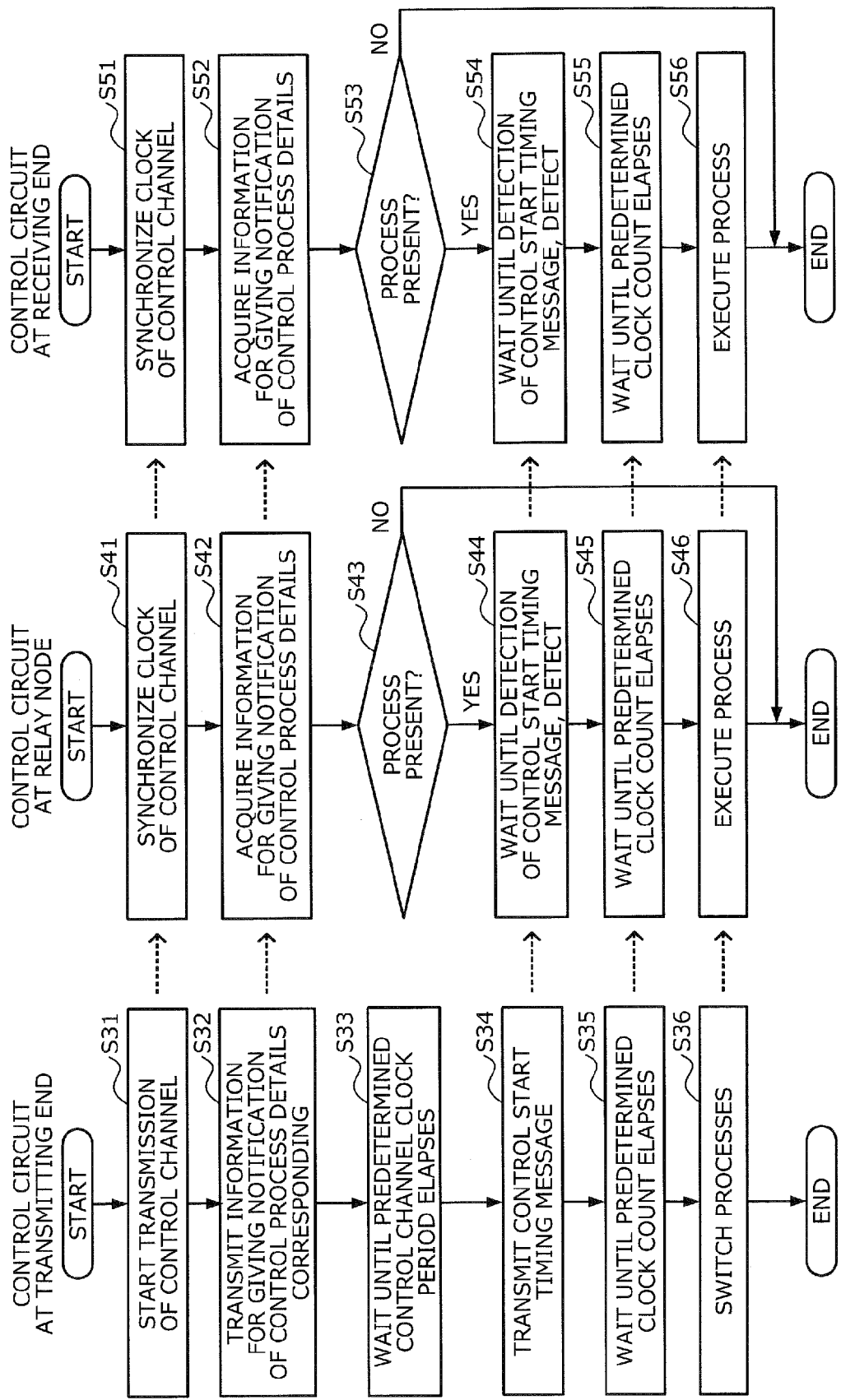
FIG. 2 is a diagram of a second example of the control timing synchronization method according to the embodiment.

FIG. 2 is a diagram of a second example of the control timing synchronization method according to the embodiment. The second example is an example of an optical transmission system in which the respective control circuits at the transmitting end, the relay node, and the receiving end in a given wavelength path have system clocks synchronized with one another.

In FIG. 2, as is the case with FIG. 1, three flowcharts represent processes of the control circuits at the transmitting end, the relay node, and the receiving end, respectively from the left side. Dotted-lined arrows between the flowcharts represent temporal correlations.

For example, when the operator inputs a process switching command in a given wavelength path for a process such as switching of the modulation mode, the transmission wavelength, the error correction mode of the main signal, or the bit rate of the main signal and execution of an operation of starting or restarting a scrambler of each node, the process depicted in FIG. 2 is started.

When the process depicted in FIG. 2 is started, first, the control circuit at the transmitting end performs control of starting transmission of a control channel by superimposition demodulation such as the intensity superimposition modulation, the frequency superimposition modulation, or the polarization superimposition modulation (step S31). As a result, a clock of the control circuit at the transmitting end or a signal capable of regenerating the clock is transmitted from the transmitting end to the relay node and the receiving end. As described later, the relay node and the receiving end receive the clock of the control circuit at the transmitting end or the signal capable of regenerating the clock to establish synchronization among the clocks of the respective control circuits and the clock of the control circuit at the transmitting end (step S41, step S51).

The control circuit at the transmitting end performs control of transmitting by superimposition demodulation such as the intensity superimposition modulation, the frequency superimposition modulation, or the polarization superimposition modulation, information for giving notification of control process details corresponding to the input process switching command (step S32). As a result, an optical signal having the main signal superimposed with the information for giving notification of control process details is transmitted from the transmitting end by a synchronous transfer scheme, for example.

Upon transmission of the optical signal at step S32, the control circuit at the transmitting end waits until a predetermined control channel clock period elapses (step S33). The predetermined control channel clock period is an example of the first period and is a period sufficient for the relay node or the receiving end to determine at step S43 or step S53, described later, whether a process to be executed by the apparatus thereof is present.

When the predetermined control channel clock period has elapsed, the control circuit at the transmitting end performs control of transmitting by superimposition demodulation such as the intensity superimposition modulation, the frequency superimposition modulation, or the polarization superimposition modulation, a message for giving notification of control start timing (step S34). As a result, an optical signal having the main signal superimposed with the message for giving notification of control start timing is transmitted from the transmitting end.

Upon transmission of the optical signal at step S34, the control circuit at the transmitting end waits until a predetermined clock count elapses (step S35). The predetermined clock count is an example of a second period and may be □□ clocks specified by the message for giving notification of control start timing. An arbitrary numeric character is denoted by □. The predetermined clock count may be determined in advance or may be set on a case-by-case basis by the control circuit at the transmitting end, according to the configuration and environment of the optical transmission system. If the predetermined clock count is determined in advance, the message for giving notification of control start timing may be a simple pulse signal.

When the predetermined clock count has elapsed, the control circuit at the transmitting end performs control of switching the processing at the apparatus thereof to a process related to signal processing, the details of which correspond to the control process details transmitted at step S32 (step S36) and terminates a sequence of the process according to the flowchart.

When receiving the optical signal transmitted from the transmitting end at step S31, the relay node establishes synchronization between the clock of the control circuit of the apparatus thereof and the clock of the control circuit at the transmitting end, based on the clock of the control circuit at the transmitting end or the signal capable of regenerating the clock (step S41). Subsequently, when receiving the optical signal transmitted from the transmitting end at step S32, the relay node demodulates the control signal superimposed on the main signal. The control circuit at the relay node acquires from the modulated control signal, the information for giving notification of control process details (step S42).

The control circuit at the relay node then determines whether a process to be executed by the apparatus thereof is present, based on the information for giving notification of control process details (step S43). This determination is made while the control circuit at the transmitting end waits for the predetermined control channel clock period to elapse at step S33.

If no such process is present (step S43: NO), the control circuit at the relay node terminates the process according to the flowchart. On the other hand, if a process to be executed is present (step S43: YES), the control circuit at the relay node waits until the relay node detects a message for giving notification of control start timing. The relay node detects the message for giving notification of control start timing by receiving the optical signal transmitted from the transmitting end at step S34 and demodulating the control signal superimposed on the main signal (step S44).

The control circuit at the relay node then waits until a predetermined clock count elapses (step S45). The predetermined clock count is an example of the second period and is the same as the predetermined clock count during which the transmitting end waits at step S35. When the predetermined clock count has elapsed, the control circuit at the relay node performs control of executing a process corresponding to the control process details acquired at step S42 (step S46) and terminates a sequence of the process according to the flowchart.

When receiving the optical signal transmitted from the transmitting end at step S31, for example, from the relay node, the receiving end establishes synchronization between the clock of the control circuit of the apparatus thereof and the clock of the control circuit at the transmitting end, based on the clock of the control circuit at the transmitting end or the signal capable of regenerating the clock (step S51). Subsequently, when receiving the optical signal transmitted from the transmitting end at step S32, for example, from the relay node, the receiving end demodulates the control signal superimposed on the main signal. The control circuit at the receiving end acquires from the modulated control signal, the information for giving notification of control process details (step S52).

The control circuit at the receiving end then determines whether a process to be executed by the apparatus thereof is present, based on the information for giving notification of control process details (step S53). This determination is made while the control circuit at the transmitting end waits for the predetermined control channel clock period to elapse at step S33.

If no such process is present (step S53: NO), the control circuit at the receiving end terminates the process according to the flowchart. On the other hand, if a process to be executed is present (step S53: YES), the control circuit at the receiving end waits until the receiving end detects a message for giving notification of control start timing. The receiving end detects the message for giving notification of control start timing by receiving the optical signal transmitted from the transmitting end at step S34, for example, from the relay node, and demodulating the control signal superimposed on the main signal (step S54).

The control circuit at the receiving end then waits until a predetermined clock count elapses (step S55). The predetermined clock count is an example of the second period and is the same as the predetermined clock count during which the transmitting end waits at step S35. When the predetermined clock count has elapsed, the control circuit at the receiving end performs control of executing a process corresponding to the control process details acquired at step S52 (step S56) and terminates a sequence of the process according to the flowchart.

As described in the first example of the control timing synchronization method, since the control signal is superimposed on the main signal and is transmitted at the same wavelength through the same path as the main signal, no skew occurs between the main signal and the control signal consequent to wavelength dispersion of optical fibers. Since optoelectronic conversion nor electrooptic conversion needs be performed for the optical signal of the control signal at the relay node, no delay occurs in the relaying process of the control signal.

Therefore, an optical signal transmitted from the transmitting end immediately after the switch to the process corresponding to the control process details at the transmitting end reaches the relay node immediately after the execution of the process corresponding to the control process details at the relay node, causing no problem. Similarly, the optical signal transmitted from the transmitting end immediately after the switch to the process corresponding to the control process details at the transmitting end reaches the receiving end immediately after the execution of the process corresponding to the control process details at the receiving end, causing no problem.

According to the control timing synchronization method depicted in FIG. 2, as is the case with the first example, the timings of switching processes at the transmitting end, the relay node, and the receiving end can be synchronized. As a result, since downtime of a given wavelength path in the optical transmission system can be ended in the predetermined clock count at step S35 at the transmitting end, the downtime can be minimized. By transmitting from the transmitting end, the clock of the control circuit at the transmitting end or a signal capable of regenerating the clock, the clock of the control circuit at the relay node and/or the receiving end can be synchronized with the clock of the control circuit at the transmitting end. As a result, the timings of switching processes at the transmitting end, the relay node, and the receiving end can be controlled more precisely, enabling further reduction of the downtime.

In the control timing synchronization methods depicted in FIGS. 1 and 2, the process of the control circuit at the transmitting end may be executed by an optical transmission apparatus acting as the transmitting end. An example of the optical transmission apparatus acting as the transmitting end will be described.

Figure 3:
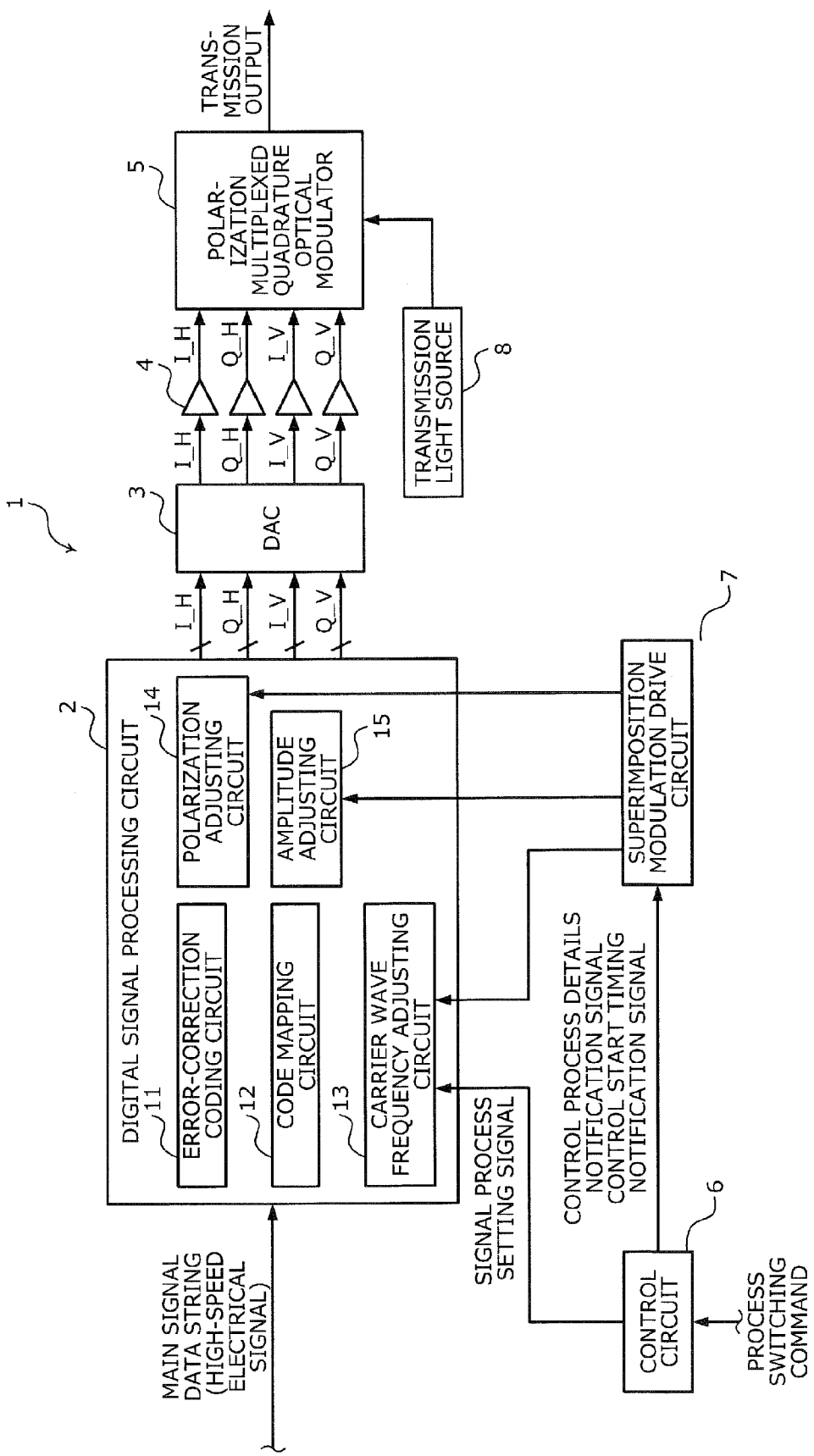
FIG. 3 is a diagram of an example of an optical transmission apparatus acting as a transmitting end according to the embodiment.

FIG. 3 is a diagram of an example of the optical transmission apparatus acting as the transmitting end according to the embodiment. As depicted in FIG. 3, an optical transmission apparatus 1 acting as the transmitting end may have, for example, a digital signal processing circuit 2, a digital-analog converter (DAC) 3, a modulator driver amplifier 4, a polarization multiplexed quadrature optical modulator 5, a control circuit 6, a superimposition modulation drive circuit 7, and a transmission light source 8.

The control circuit 6 is connected to a command input terminal not depicted. A process switching command is input to the command input terminal. The control circuit 6 outputs a signal process setting signal for setting the signal process details in the digital signal processing circuit 2. The control circuit 6 outputs a control process details notification signal for notifying the relay node or the receiving end of information for giving notification of control process details corresponding to the process switching command. The control circuit 6 outputs a control start timing notification signal for notifying the relay node or the receiving end of a message for giving notification of the control start timing. Details of a hardware configuration and a functional configuration of the control circuit 6 will be described later.

The superimposition modulation drive circuit 7 is connected to the control circuit 6. The superimposition modulation drive circuit 7 outputs a drive signal for performing the superimposition modulation at the timing based on the control start timing notification signal output from the control circuit 6 and based on the control process details notification signal output from the control circuit 6 to the digital signal processing circuit 2.

The digital signal processing circuit 2 is connected to a data input terminal not depicted, the control circuit 6, and the superimposition modulation drive circuit 7. A high-speed electrical signal of a main signal data string is input to the data input terminal. The digital signal processing circuit 2 executes a digital signal process for the high-speed electrical signal, based on the signal process setting signal output from the control circuit 6 and outputs an in-phase component $I\_H$ and a quadrature phase component $Q\_H$ for a horizontal signal component, as well as an in-phase component $I\_V$ and a quadrature phase component $Q\_V$ for a vertical signal component, for example.

The digital signal processing circuit 2 may have, for example, an error-correction coding circuit 11, a code mapping circuit 12, a carrier wave frequency adjusting circuit 13, a polarization adjusting circuit 14, and an amplitude adjusting circuit 15. The error-correction coding circuit 11 generates and adds error correction code to the main signal data string. The code mapping circuit 12 assigns code to the main signal data string.

The carrier wave frequency adjusting circuit 13 modulates the frequency of carrier waves based on the drive signal output from the superimposition modulation drive circuit 7, if the frequency superimposition modulation is performed. The polarization adjusting circuit 14 modulates a polarization state based on the drive signal output from the superimposition modulation drive circuit 7, if the polarization superimposition modulation is performed. The amplitude adjusting circuit 15 modulates amplitude based on the drive signal output from the superimposition modulation drive circuit 7, if the polarization superimposition modulation is performed. The amplitude adjusting circuit 15 may modulate amplitude by adjusting an adjustment magnification in a circuit performing amplitude adjustment calculation.

The DAC 3 is connected to the digital signal processing circuit 2. The DAC 3 converts each of the signal components I_H, Q_H, I_V, and Q_V output from the digital signal processing circuit 2 into an analog signal and outputs the signal. The intensity superimposition modulation may be performed by adjusting a reference voltage in the DAC 3, based on the drive signal output from the superimposition modulation drive circuit 7 to modulate an analog voltage value output from the DAC 3.

The modulator driver amplifier 4 is connected to the DAC 3. The modulator driver amplifier 4 amplifies each of the signal components I_H, Q_H, I_V, and Q_V output from the DAC 3 to a signal at a level capable of driving the polarization multiplexed quadrature optical modulator 5. The intensity superimposition modulation may be performed by modulating the gain with a gain control terminal of the modulator driver amplifier 4, based on the drive signal output from the superimposition modulation drive circuit 7.

The transmission light source 8 outputs light. The transmission light source 8 may be a laser diode, for example. The transmission light source 8 may be connected to a drive circuit not depicted, for example. The intensity superimposition modulation may be performed by modulating the optical power of the transmission light source 8, based on the drive signal output from the superimposition modulation drive circuit 7. Alternatively, the frequency superimposition modulation may be performed by FM modulation of the transmission light source 8, based on the drive signal output from the superimposition modulation drive circuit 7.

The polarization multiplexed quadrature optical modulator 5 is connected to the modulator driver amplifier 4 and the transmission light source 8. The polarization multiplexed quadrature optical modulator 5 performs polarization multiplexed quadrature modulation of the light output from the transmission light source 8, based on the signal components I_H, Q_H, I_V, and Q_V output from the modulator driver amplifier 4 and outputs the light. An example of the polarization multiplexed quadrature optical modulator 5 includes that described in the Implementation Agreement of the Optical Internetworking Forum, "OIF-PMQ-TX-01.0-Implementation Agreement for Integrated Polarization Multiplexed Quadrature Modulated Transmitters" (March 2010), for example. The intensity superimposition modulation may be performed by modulating the optical power of transmission output of the polarization multiplexing orthogonal optical modulator 5, for example, modulating gain and loss of an optical amplifier and an optical attenuator, based on the drive signal output from the superimposition modulation drive circuit 7.

Figure 4:
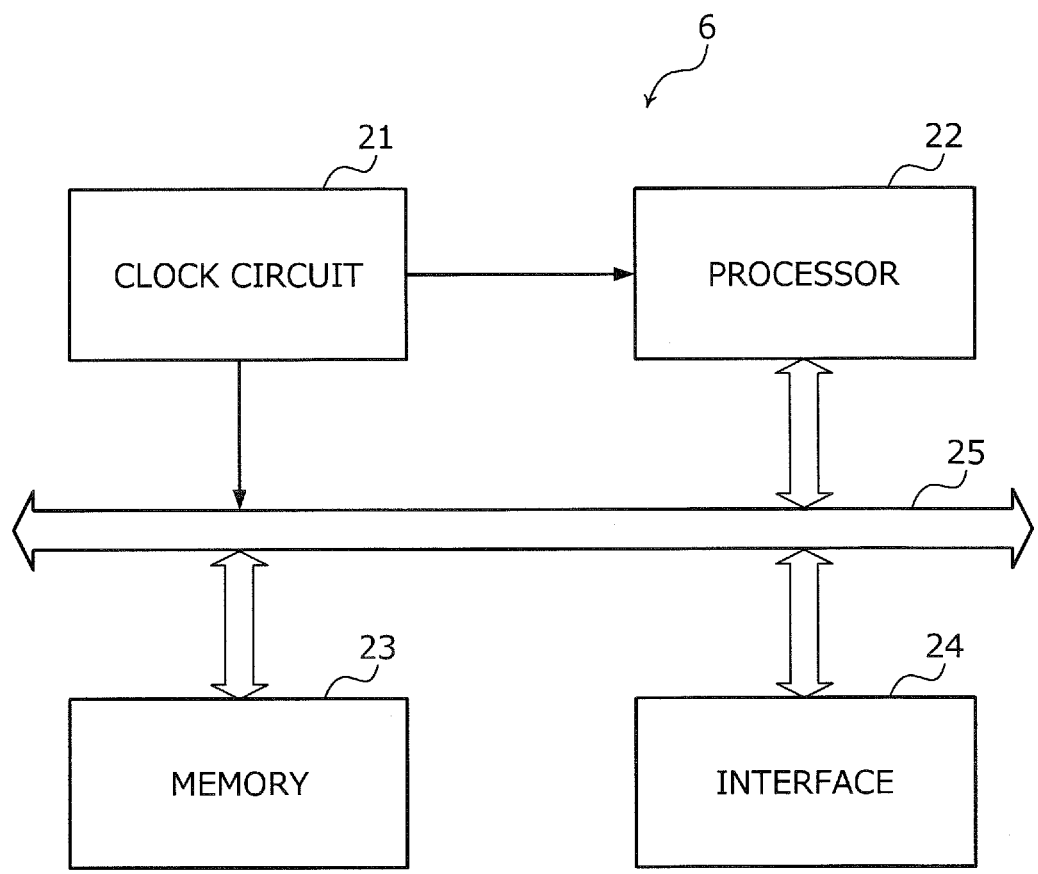
FIG. 4 is a diagram of an example of a hardware configuration of a control circuit.

FIG. 4 is a diagram of an example of a hardware configuration of the control circuit. As depicted in FIG. 4, the control circuit 6 may have a clock circuit 21, a processor 22, a memory 23, and an interface 24. The processor 22, the memory 23, and the interface 24 are connected to a bus 25. The clock circuit 21 is connected to the processor 22 and the bus 25 and supplies the clock to the processor 22 and the bus 25.

The processor 22 operates according to the clock supplied from the clock circuit 21. A central processing unit (CPU) and an application specific integrated circuit (ASIC) are examples of the processor 22. The processor 22 may be a programmable logic device such as a field programmable gate array (FPGA), for example.

The memory 23 may store a boot program. The memory 23 may be used as a work area of the processor 22. If the processor 22 is a CPU, the memory 23 may store a program for implementing steps S1 to S5 in the first example or steps S31 to S36 in the second example of the control timing synchronization method described above. If the processor 22 is an FPGA, the memory 23 may store configuration data for implementing steps S1 to S5 in the first example or steps S31 to S36 in the second example of the control timing synchronization method described above. The memory 23 may be built into the processor 22.

The interface 24 controls the input of the process switching command, the output of the signal process setting signal, the output of the control process details notification signal, and the output of the control start timing notification signal described above.

Figure 5:
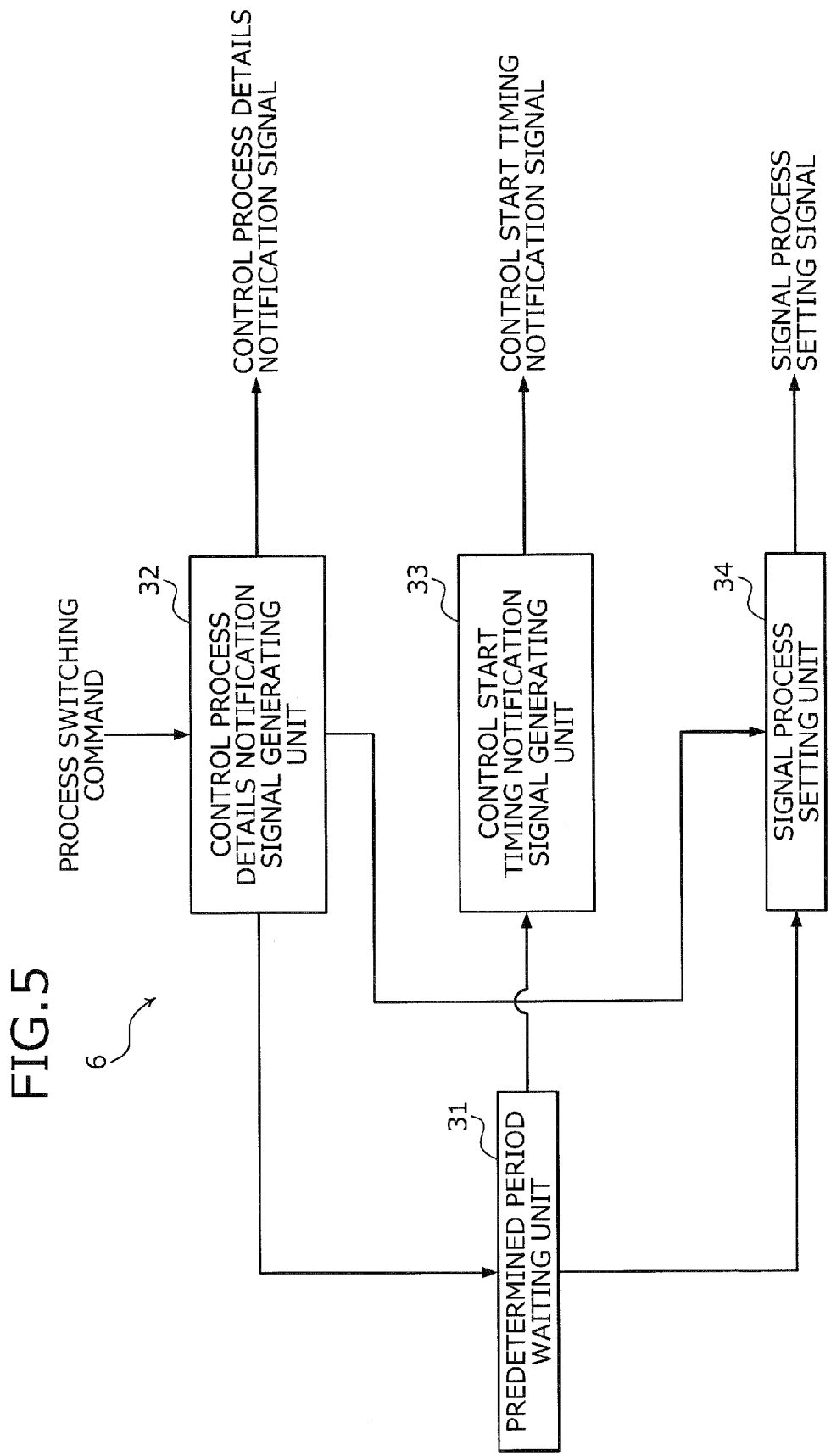
FIG. 5 is a diagram of an example of a functional configuration of the control circuit.

FIG. 5 is a diagram of an example of a functional configuration of the control circuit. As depicted in FIG. 5, the control circuit 6 may have a predetermined period waiting unit 31, a control process details notification signal generating unit 32, a control start timing notification signal generating unit 33, and a signal process setting unit 34. These functional units 31 to 34 may be implemented by the processor 22 executing the operations at steps S1 to S5 in the first example or steps S31 to S36 in the second example of the control timing synchronization method described above.

The control process details notification signal generating unit 32 generates and outputs to the superimposition modulation drive circuit 7, a control process details notification signal corresponding to the input process switching command. As a result, the superimposition modulation drive circuit 7 drives the carrier wave frequency adjusting circuit 13, the polarization adjusting circuit 14, or the amplitude adjusting circuit 15 of the digital signal processing circuit 2, for example, and the optical signal having the main signal superimposed with the information for giving notification of control process details is output from the polarization multiplexed quadrature optical modulator 5. The control process details notification signal generating unit 32 may execute the operation at step S1 in the first example or step S32 in the second example of the control timing synchronization method described above, for example.

When receiving the notification of expiration of the predetermined guard time from the predetermined period waiting unit 31, the control start timing notification signal generating unit 33 generates and outputs the control start timing notification signal to the superimposition modulation drive circuit 7. As a result, the superimposition modulation drive circuit 7 drives the carrier wave frequency adjusting circuit 13, the polarization adjusting circuit 14, or the amplitude adjusting circuit 15 of the digital signal processing circuit 2, for example, and the optical signal having the main signal superimposed with the message for giving notification of control start timing is output from the polarization multiplexed quadrature optical modulator 5. The control start timing notification signal generating unit 33 may execute the operation at step S3 in the first example or step S34 in the second example of the control timing synchronization method described above, for example.

When receiving the notification of expiration of the predetermined waiting period from the predetermined period waiting unit 31, the signal process setting unit 34 generates and outputs to the digital signal processing circuit 2, the signal process setting signal based on information for giving notification of control process details. As a result, the process executed by the digital signal processing circuit 2 is set to the process corresponding to the control process details of the information for giving notification of control process details. The signal process setting unit 34 may execute the operation at step S5 in the first example or step S36 in the second example of the control timing synchronization method described above, for example.

For example, when the control process details notification signal is output from the control process details notification signal generating unit 32, the predetermined period waiting unit 31 stops the operation of the digital signal processing circuit 2 and waits until the predetermined guard time elapses. After the predetermined guard time has elapsed, the predetermined period waiting unit 31 notifies the control start timing notification signal generating unit 33 of the expiration of the predetermined guard time, then stops the operation of the digital signal processing circuit 2, and waits until the predetermined waiting period elapses. After the predetermined waiting period has elapsed, the predetermined period waiting unit 31 notifies the signal process setting unit 34 of the expiration of the predetermined waiting period. The predetermined period waiting unit 31 may execute the operation at step S2 or S4 in the first example or step S33 or S35 in the second example of the control timing synchronization method described above, for example.

According to the optical transmission apparatus 1 depicted in FIGS. 3 to 5, since the control process details and the control start timing are superimposed on the main signal by the intensity superimposition modulation, the frequency superimposition modulation, or the polarization superimposition modulation for the notification to the relay node or the receiving end, control can be provided for the control process details and the start timing of the control process details at the relay node and the receiving end. The start timing of the control process details at the relay node or the receiving end can be controlled match the start timing of the signal process details in the optical transmission apparatus 1, thereby minimizing downtime of a given wavelength path in the optical transmission system.

In the control timing synchronization method depicted in FIG. 1 or 2, the process of the control circuit at the relay node may be executed by the optical transmission apparatus acting as the relay node. An example of the optical transmission apparatus acting as the relay node will be described.

Figure 6:
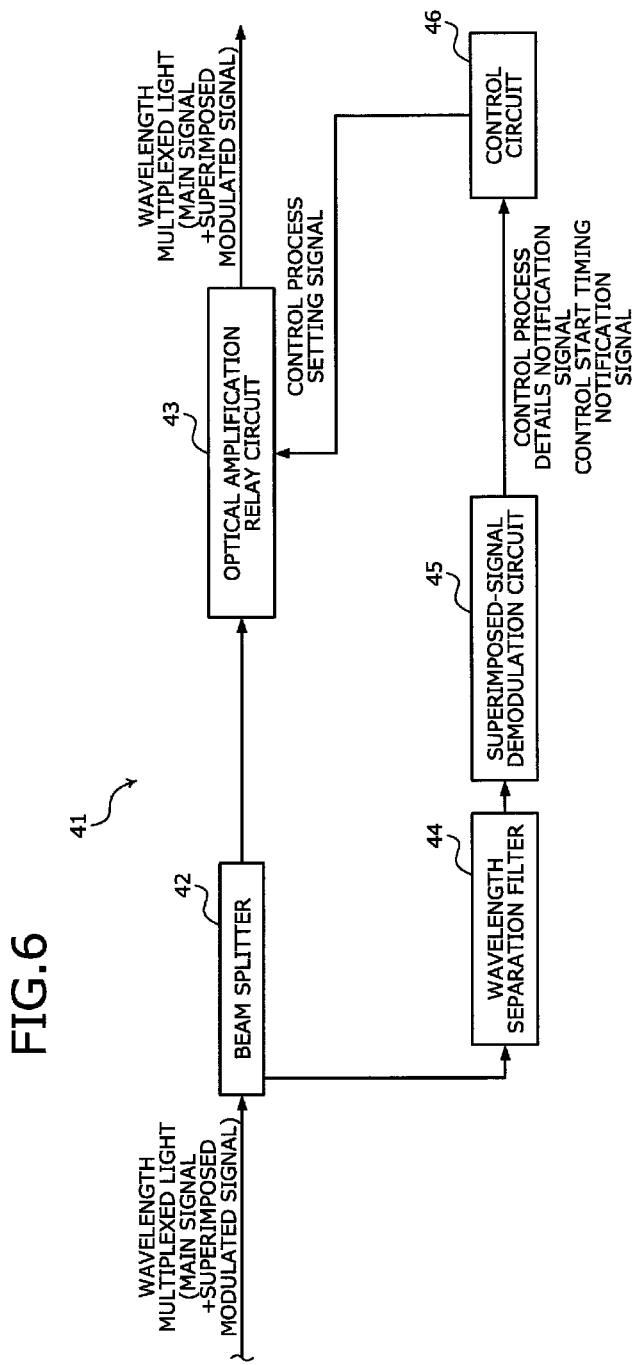
FIG. 6 is a diagram of an example of the optical transmission apparatus acting as a relay node according to the embodiment.

FIG. 6 is a diagram of an example of the optical transmission apparatus acting as the relay node according to the embodiment. As depicted in FIG. 6, an optical transmission apparatus 41 acting as the relay node may have, for example, a beam splitter 42, an optical amplification relay circuit 43, a wavelength separation filter 44, a superimposed-signal demodulation circuit 45, and a control circuit 46.

The beam splitter 42 may be connected to an optical input port not depicted. For example, wavelength multiplexed light acquired by multiplexing lights of multiple wavelengths is input to the optical input port, from an optical transmission path. The wavelength multiplexed light is output from an upstream node such as the transmitting end or another relay node, for example. The wavelength multiplexed light includes the main signal and the control process details notification signal or the control start timing notification signal for each wavelength path. The beam splitter 42 splits the input wavelength multiplexed light into, for example, two branches and outputs the branches to the optical amplification relay circuit 43 and the wavelength separation filter 44.

The wavelength separation filter 44 is connected to the beam splitter 42. The wavelength separation filter 44 transmits signal light of a given wavelength path among the wavelength multiplexed light output from the beam splitter 42 and blocks the signal light of other wavelength paths. The signal light transmitted by the wavelength separation filter 44 includes the main signal transmitted through the given wavelength path and the control process details notification signal or the control start timing notification signal.

The superimposed-signal demodulation circuit 45 is connected to the wavelength separation filter 44. The superimposed-signal demodulation circuit 45 demodulates and outputs the control process details notification signal and the control start timing notification signal from the optical signal output from the wavelength separation filter 44. A specific example of the superimposed-signal demodulation circuit 45 will be described later.

The control circuit 46 is connected to the superimposed-signal demodulation circuit 45. The control circuit 46 generates a control process details setting signal for setting the control process details in the optical amplification relay circuit 43, based on the control process details notification signal output from the superimposed-signal demodulation circuit 45. The control circuit 46 outputs the control process details setting signal to the optical amplification relay circuit 43 at the timing based on the control start timing notification signal output from the superimposed-signal demodulation circuit 45.

The hardware configuration of the control circuit 46 is the same as the configuration depicted in FIG. 4 and therefore will not be described again. However, if the processor 22 is a CPU, the memory 23 may store a program for implementing steps S11 to S15 in the first example or steps S41 to S46 in the second example of the control timing synchronization method described above. If the processor 22 is an FPGA, the memory 23 may store configuration data for implementing steps S11 to S15 in the first example or steps S41 to S46 in the second example of the control timing synchronization method described above.

The interface 24 controls the output of the control process details setting signal, the input of the control process details notification signal, and the input of the control start timing notification signal described above. The functional configuration of the control circuit 46 will be described later.

The optical amplification relay circuit 43 is connected to the beam splitter 42 and the control circuit 46. The optical amplification relay circuit 43 amplifies and outputs the other wavelength multiplexed light output from the beam splitter 42, for example. The wavelength multiplexed light output from the optical amplification relay circuit 43 may be output from an optical output port, not depicted, to an optical transmission path. The optical amplification relay circuit 43 sets the control process details in the apparatus thereof, based on the control process details setting signal output from the control circuit 46.

The optical amplification relay circuit 43 may include a wavelength cross-connect or optical branching/inserting circuit. In this case, wavelength multiplexed light is input to the optical amplification relay circuit 43, and wavelength multiplexed light is output from the optical amplification relay circuit 43.

Figure 7:
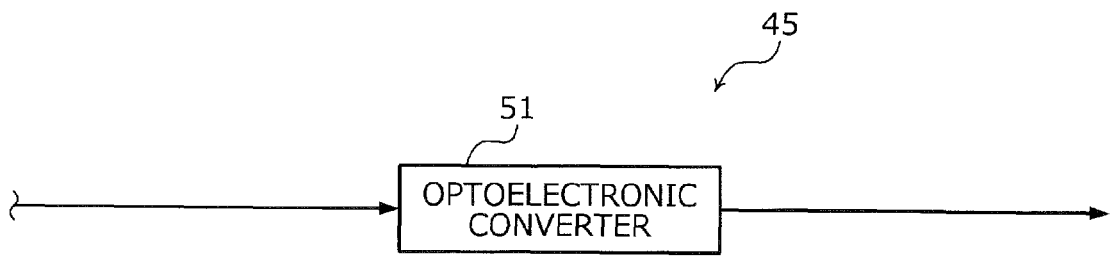
FIG. 7 is a diagram of a first example of a superimposed-signal demodulation circuit.

FIG. 7 is a diagram of a first example of a superimposed-signal demodulation circuit. The example depicted in FIG. 7 is an example of the superimposed-signal demodulation circuit 45 when the control process details notification signal and the control start timing notification signal are subjected to the intensity superimposition modulation. As depicted in FIG. 7, the superimposed-signal demodulation circuit 45 has an optoelectronic converter 51.

The optoelectronic converter 51 converts into an electrical signal, an optical signal of the given wavelength path and output from the wavelength separation filter 44. As a result, the superimposed-signal demodulation circuit 45 can directly acquire the superimposed and modulated information based on the level of the electrical signal. A photodiode operating at low speed is an example of the optoelectronic converter 51. A low pass filter may be disposed downstream from the optoelectronic converter 51 to remove an intensity modulation component and a noise component of the main signal with the low pass filter.

Figure 8:
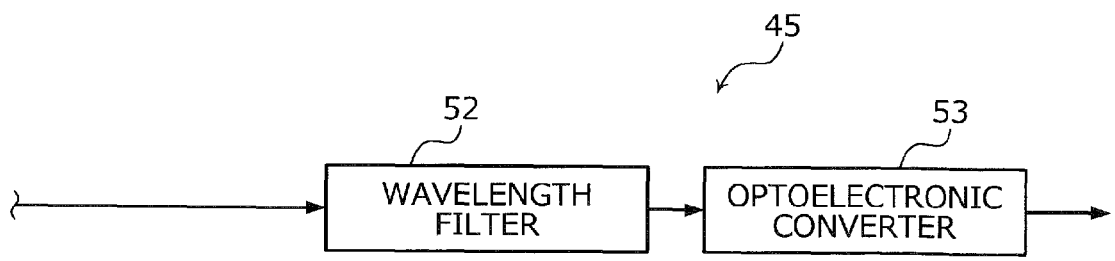
FIG. 8 is a diagram of a second example of the superimposed-signal demodulation circuit.

FIG. 8 is a diagram of a second example of the superimposed-signal demodulation circuit. The example depicted in FIG. 8 is an example of the superimposed-signal demodulation circuit 45 when the control process details notification signal and the control start timing notification signal are subjected to the frequency superimposition modulation. As depicted in FIG. 8, the superimposed-signal demodulation circuit 45 has a wavelength filter 52 and an optoelectronic converter 53.

The wavelength filter 52 is a wavelength-dependent optical filter and converts into the intensity superimposition modulation, an optical signal of the given wavelength path and output from the wavelength separation filter 44. The conversion from the frequency superimposition modulation into the intensity superimposition modulation by transmitting a signal subjected to the frequency superimposition modulation through a wavelength filter is described in Tanimura, Takahito, et al, "Superimposition and Detection of Frequency Modulated Tone For Light Path Tracing Employing Digital Signal Processing and Optical Filter", Optical Fiber Communication Conference and Exposition (OFC) and the National Fiber Optic Engineers Conference (NFOEC) 2012 (United States), Mar. 4, 2012. The wavelength filter 52 may be eliminated and the wavelength separation filter 44 may act also as the wavelength filter 52.

The optoelectronic converter 53 is connected to the wavelength filter 52. The optoelectronic converter 53 converts an optical signal subjected to the intensity superimposition modulation into an electrical signal. As a result, the superimposed-signal demodulation circuit 45 can directly acquire the superimposed and modulated information based on the level of the electrical signal. A photodiode operating at low speed is an example of the optoelectronic converter 53. A low pass filter may be disposed downstream from the optoelectronic converter 53 to remove an intensity modulation component and a noise component of the main signal with the low pass filter.

Figure 9:
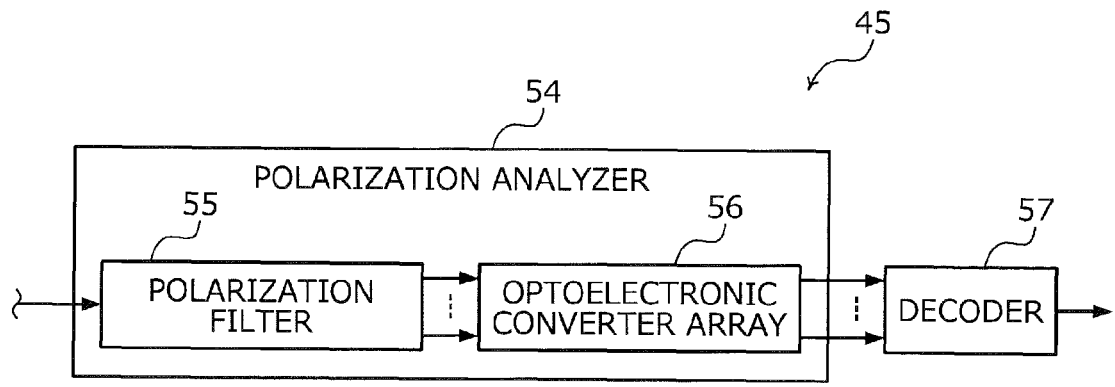
FIG. 9 is a diagram of a third example of the superimposed-signal demodulation circuit.

FIG. 9 is a diagram of a third example of the superimposed-signal demodulation circuit. The example depicted in FIG. 9 is an example of the superimposed-signal demodulation circuit 45 when the control process details notification signal and the control start timing notification signal are subjected to the polarization superimposition modulation. As depicted in FIG. 9, the superimposed-signal demodulation circuit 45 has a polarization analyzer 54 and a decoder 57. The polarization analyzer 54 has a polarization filter 55 and an optoelectronic converter array 56 and is also referred to as a state-of-polarization (SOP) monitor or a Stokes analyzer.

The polarization analyzer 54 transmits an optical signal that is of a given wavelength path and output from the wavelength separation filter 44, through the polarization filter 55 to convert multiple optical signals output from the polarization filter 55 with the optoelectronic converter array 56 into respective electrical signals. The decoder 57 demodulates the superimposed and modulated information based on the multiple electrical signals output from the polarization analyzer 54.

In the case of the polarization superimposition demodulation, Manchester coding may also be used at the transmitting end so as to suppress the effect of a low speed polarization variation component. In this case, the process of the decoder 57 includes a decoding process for the Manchester coding. A low pass filter may be disposed downstream from the optoelectronic converter array 56 to remove an intensity modulation component and a noise component of the main signal with the low pass filter.

Figure 10:
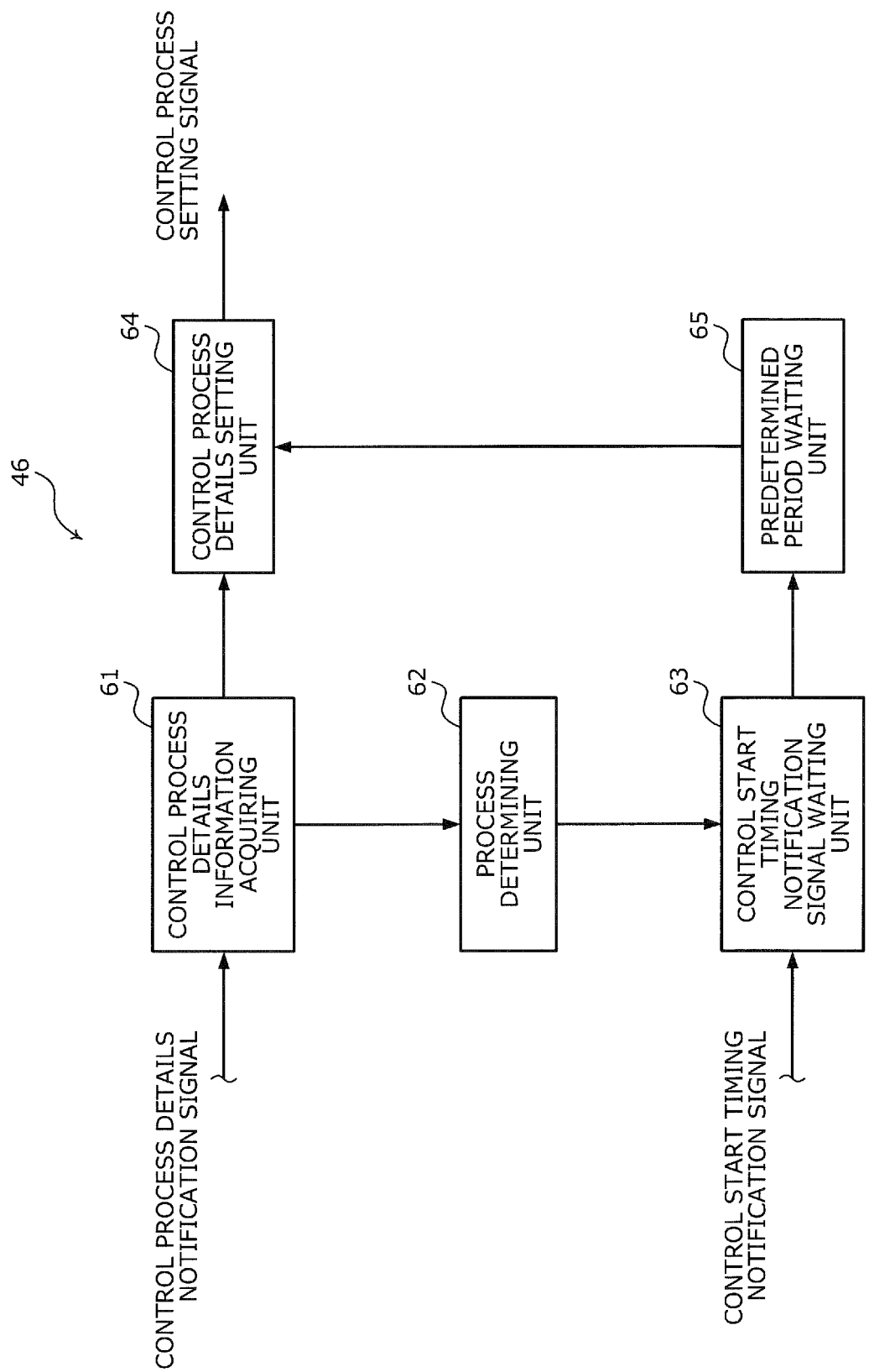
FIG. 10 is a diagram of an example of a functional configuration of the control circuit.

FIG. 10 is a diagram of an example of a functional configuration of the control circuit. As depicted in FIG. 10, the control circuit 46 may have a control process details information acquiring unit 61, a process determining unit 62, a control start timing notification signal waiting unit 63, a control process details setting unit 64, and a predetermined period waiting unit 65. These functional units 61 to 65 may be implemented by the processor 22 executing the operations at steps S11 to S15 in the first example or steps S41 to S46 in the second example of the control timing synchronization method described above.

The control process details information acquiring unit 61 acquires information for giving notification of control process details based on the control process details notification signal output from the superimposed-signal demodulation circuit 45. The control process details information acquiring unit 61 may execute the operation at step S11 in the first example or step S42 in the second example of the control timing synchronization method described above, for example.

The process determining unit 62 determines whether a process to be executed by the apparatus thereof is present, based on the information for giving notification of control process details. The process determining unit 62 may execute the operation at step S12 in the first example or step S43 in the second example of the control timing synchronization method described above, for example.

If the process determining unit 62 determines that a process to be executed is present, the control start timing notification signal waiting unit 63 waits until a control start timing notification signal is detected. When a control start timing notification signal is output from the superimposed-signal demodulation circuit 45 while the control start timing notification signal waiting unit 63 is waiting, the control start timing notification signal waiting unit 63 detects the control start timing notification signal. The control start timing notification signal waiting unit 63 may execute the operation at step S13 in the first example or step S44 in the second example of the control timing synchronization method described above, for example.

If the control start timing notification signal waiting unit 63 detects the control start timing notification signal, the predetermined period waiting unit 65 stops the operation of the optical amplification relay circuit 43 and waits until the predetermined waiting period elapses. After the predetermined waiting period has elapsed, the predetermined period waiting unit 65 notifies the control process details setting unit 64 of the expiration of the predetermined waiting period. The predetermined period waiting unit 65 may execute the operation at step S14 in the first example or step S45 in the second example of the control timing synchronization method described above, for example.

When receiving the notification of the expiration of the predetermined waiting period from the predetermined period waiting unit 65, the control process details setting unit 64 generates and outputs to the optical amplification relay circuit 43, the control process details setting signal based on the information for giving notification of control process details. As a result, the process executed by the optical amplification relay circuit 43 is set to the process corresponding to the control process details of the information for giving notification of control process details. The control process details setting unit 64 may execute the operation at step S15 in the first example or step S46 in the second example of the control timing synchronization method described above, for example.

According to the optical transmission apparatus 41 depicted in FIGS. 6 to 10, since the control process details and the control start timing are superimposed on the main signal by the intensity superimposition modulation, the frequency superimposition modulation, or the polarization superimposition modulation for the notification, the control process details and the start timing of the control process details at the relay node are controlled by the transmitting end. The start timing of the control process details at the relay node can be controlled to match the start timing of the signal process details at the transmitting end, thereby minimizing the downtime of a given wavelength path in the optical transmission system. Since the control signal channel alone may be demodulated, the configuration is simplified and the control timing can be synchronized at high-speed without waiting for communication of the main signal.

In the control timing synchronization method depicted in FIG. 1 or 2, the process of the control circuit at the receiving end may be executed by an optical transmission apparatus acting as the receiving end. An example of the optical transmission apparatus acting as the receiving end will be described.

Figure 11:
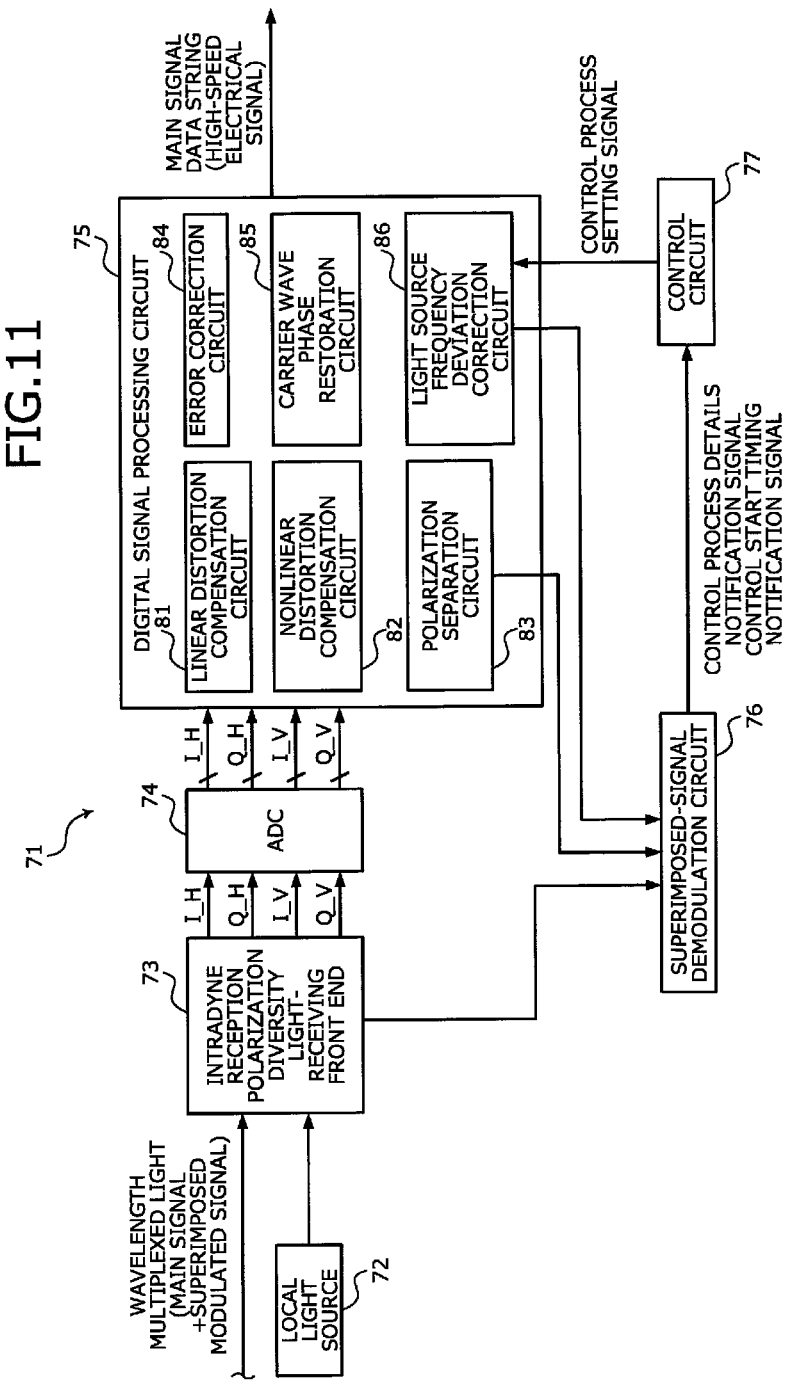
FIG. 11 is a diagram of an example of the optical transmission apparatus acting as a receiving end according to the embodiment.

FIG. 11 is a diagram of an example of the optical transmission apparatus acting as the receiving end according to the embodiment. As depicted in FIG. 11, an optical transmission apparatus 71 acting as the receiving end may have, for example, a local light source 72, an intradyne reception polarization diversity light-receiving front end 73, an analog-digital convertor (ADC) 74, a digital signal processing circuit 75, a superimposed-signal demodulation circuit 76, and a control circuit 77.

The local light source 72 outputs light for coherent reception. The local light source 72 may be a laser diode outputting light of substantially the same wavelength as the wavelength of signal light input from an optical transmission path not depicted, for example.

The intradyne reception polarization diversity light-receiving front end 73 may be connected to the local light source 72 and an optical input port, not depicted. To the optical input port, for example, wavelength multiplexed light is input from the optical transmission path. The wavelength multiplexed light is output from an upstream node such as the transmitting end or another relay node, for example. The wavelength multiplexed light includes the main signal and the control process details notification signal or the control start timing notification signal for each wavelength path. The intradyne reception polarization diversity light-receiving front end 73 mixes the signal light input from the optical input port and the light output from the local light source 72 and performs optoelectronic conversion to output the signal components I_H, Q_H, I_V, and Q_V.

An example of the intradyne reception polarization diversity light-receiving front end 73 includes that described in the Implementation Agreement of the Optical Internetworking Forum, "OIF-DPC-RX-01.1-Implementation Agreement for Integrated Dual Polarization Intradyne Coherent Receivers" (September 2011), for example. The intradyne reception polarization diversity light-receiving front end 73 may house an amplifier that amplifies electrical signals after the optoelectronic conversion and an automatic gain control circuit that provides gain control to the amplifier.

The ADC 74 is connected to the intradyne reception polarization diversity light-receiving front end 73. The ADC 74 converts the signal components I_H, Q_H, I_V, and Q_V output from the intradyne reception polarization diversity light-receiving front end 73 into respective digital signals and outputs the signals.

The digital signal processing circuit 75 is connected to the ADC 74 and the control circuit 77. The digital signal processing circuit 75 executes a digital signal process of the signal components I_H, Q_H, I_V, and Q_V output from the ADC 74, based on the control process details setting signal output from the control circuit 77 and thereby, outputs the high-speed electrical signal of the main signal data string. The control process details setting signal is a signal for setting the control process details in the digital signal processing circuit 75. The high-speed electrical signal output from the digital signal processing circuit 75 may be transferred from a data output terminal not depicted to a processing unit downstream from the apparatus of the digital signal processing circuit 75, for example.

The digital signal processing circuit 75 may have a linear distortion compensation circuit 81, a nonlinear distortion compensation circuit 82, a polarization separation circuit 83, an error correction circuit 84, a carrier wave phase restoration circuit 85, and a light source frequency deviation correction circuit 86. The linear distortion compensation circuit 81 compensates linear distortion. The nonlinear distortion compensation circuit 82 compensates nonlinear distortion. The polarization separation circuit 83 detects a variation of polarization and outputs a detection value thereof. The error correction circuit 84 corrects errors. The carrier wave phase restoration circuit 85 restores the phase of the carrier wave. The light source frequency deviation correction circuit 86 detects a deviation of frequency of the light source and outputs a detection value thereof.

The superimposed-signal demodulation circuit 76 may be connected to the intradyne reception polarization diversity light-receiving front end 73. The superimposed-signal demodulation circuit 76 may demodulate and output the control process details notification signal and the control start timing notification signal subjected to the intensity superimposition modulation, based on a gain setting value of an amplifier in the intradyne reception polarization diversity light-receiving front end 73, for example.

Alternatively, the superimposed-signal demodulation circuit 76 may be connected to the light source frequency deviation correction circuit 86. The superimposed-signal demodulation circuit 76 may demodulate and output the control process details notification signal and the control start timing notification signal subjected to the frequency superimposition modulation, based on the deviation detection value of the light source frequency in the light source frequency deviation correction circuit 86, for example.

Alternatively, the superimposed-signal demodulation circuit 76 may be connected to the polarization separation circuit 83. The superimposed-signal demodulation circuit 76 may demodulate and output the control process details notification signal and the control start timing notification signal subjected to the polarization superimposition modulation, based on the detection value of the polarization variation in the polarization separation circuit 83, for example.

The control circuit 77 is connected to the superimposed-signal demodulation circuit 76. The control circuit 77 generates the control process details setting signal for the digital signal processing circuit 75, based on the control process details notification signal output from the superimposed-signal demodulation circuit 76. The control circuit 77 outputs the control process details setting signal to the digital signal processing circuit 75, at the timing based on the control start timing notification signal output from the superimposed-signal demodulation circuit 76.

The hardware configuration of the control circuit 77 is the same as the configuration depicted in FIG. 4 and therefore will not be described again. However, if the processor 22 is a CPU, the memory 23 may store a program for implementing steps S21 to S25 in the first example or steps S51 to S56 in the second example of the control timing synchronization method described above. If the processor 22 is an FPGA, the memory 23 may store configuration data for implementing steps S21 to S25 in the first example or steps S51 to S56 in the second example of the control timing synchronization method described above. The interface 24 controls the output of the control process details setting signal, the input of the control process details notification signal, and the input of the control start timing notification signal described above.

The functional configuration of the control circuit 77 is the same as the configuration depicted in FIG. 10 and therefore will not be described again. However, the functional units 61 to 65 in the configuration depicted in FIG. 10 may be implemented by the processor 22 executing the operations at steps S21 to S25 in the first example or steps S51 to S56 in the second example of the control timing synchronization method described above.

The control process details information acquiring unit 61 may execute the operation at step S21 in the first example or step S52 in the second example of the control timing synchronization method described above, for example. The process determining unit 62 may execute the operation at step S22 in the first example or step S53 in the second example of the control timing synchronization method described above, for example.

If the control start timing notification signal is output from the superimposed-signal demodulation circuit 76 while the control start timing notification signal is awaited, the control start timing notification signal waiting unit 63 detects the control start timing notification signal. The control start timing notification signal waiting unit 63 may execute the operation at step S23 in the first example or step S54 in the second example of the control timing synchronization method described above, for example.

When the control start timing notification signal waiting unit 63 detects the control start timing notification signal, the predetermined period waiting unit 65 stops the operation of the digital signal processing circuit 75 and waits until the predetermined waiting period elapses. The predetermined period waiting unit 65 may execute the operation at step S24 in the first example or step S55 in the second example of the control timing synchronization method described above, for example.

When receiving the notification of the expiration of the predetermined waiting period from the predetermined period waiting unit 65, the control process details setting unit 64 generates and outputs to the digital signal processing circuit 75, the control process details setting signal, based on the information for giving notification of control process details. As a result, the process executed by the digital signal processing circuit 75 is set to the process corresponding to the control process details of the information for giving notification of control process details. The control process details setting unit 64 may execute the operation at step S25 in the first example or step S56 in the second example of the control timing synchronization method described above, for example.

According to the optical transmission apparatus 71 depicted in FIG. 11, since the control process details and the control start timing are superimposed on the main signal through the intensity superimposition modulation, the frequency superimposition modulation, or the polarization superimposition modulation for the notification, the control process details and the start timing of the control process details at the receiving end are controlled by the transmitting end. The start timing of the control process details at the receiving end can be controlled matched the start timing of the signal process details at the transmitting end, thereby minimizing the downtime of a given wavelength path in the optical transmission system. Since the control signal channel alone may be demodulated to synchronize the control timing, the configuration is simplified and the control timing can be synchronized at high-speed without waiting for communication of the main signal. The optical transmission apparatus 71 acting as the receiving end is not limited to an apparatus performing the coherent reception.

The optical transmission system to which the control timing synchronization method depicted in FIG. 1 or 2 is applied or the optical transmission system having the optical transmission apparatus depicted in FIGS. 3 to 11 is applicable to a dense wavelength division multiplexing (DWDM) system of a photonic network, for example. An example of the optical transmission system will be described.

Figure 12:
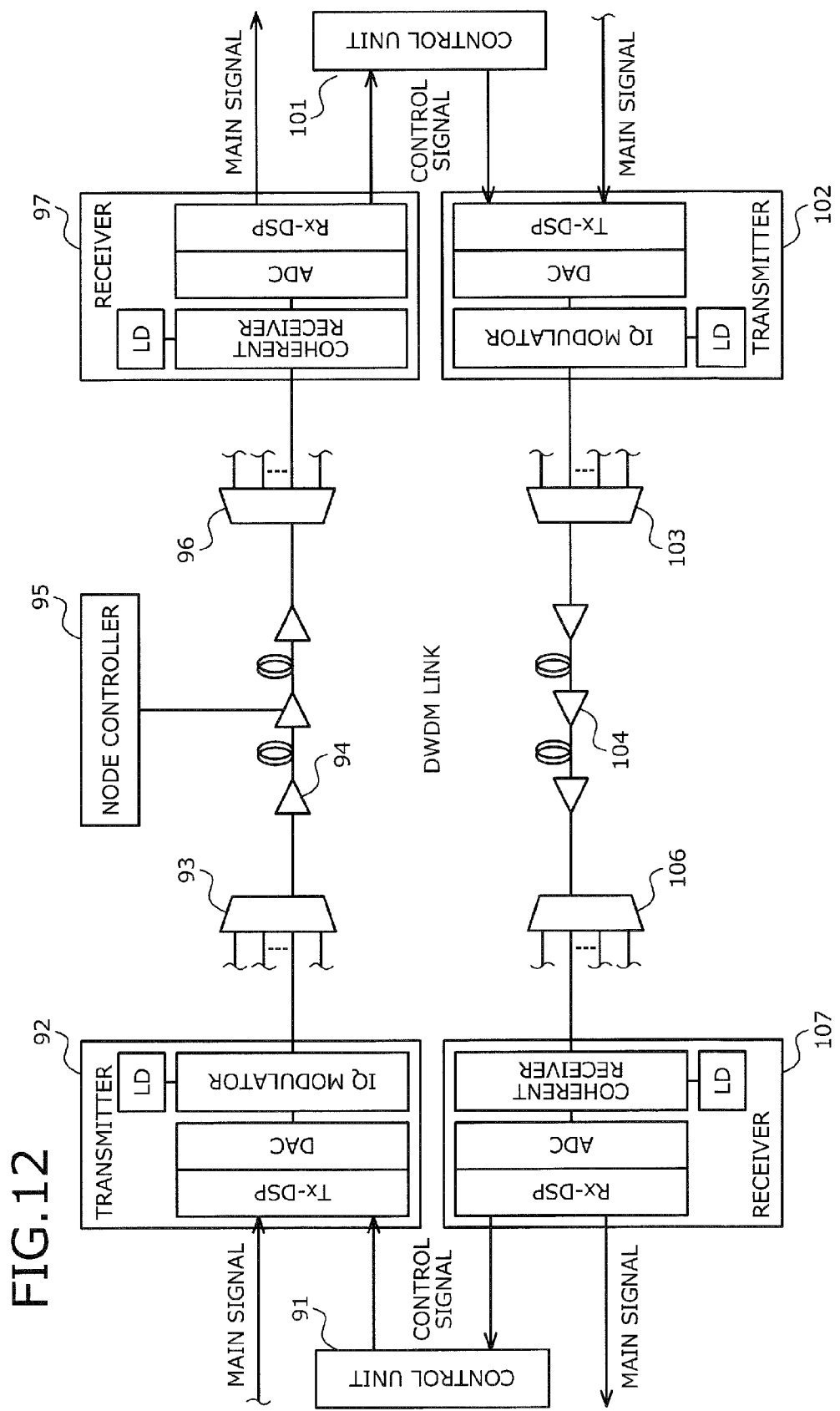
FIG. 12 is a diagram of an example of an optical transmission system according to the embodiment.

An example of a photonic network will be described. FIG. 12 is a diagram of an example of the optical transmission system according to the embodiment. In FIG. 12, control units 91 and 101 are the control circuit 6 in the optical transmission apparatus 1 acting as the transmitting end for the optical transmission apparatus 1 acting as the transmitting end and the control circuit 77 in the optical transmission apparatus 71 acting as the receiving end for the optical transmission apparatus 71 acting as the receiving end.

Transmitters 92 and 102 are the optical transmission apparatus 1 acting as the transmitting end. The transmitters 92 and 102 may have a transmission side digital signal processor (Tx-DSP), a DAC, an IQ modulator, and a laser diode (LD). The Tx-DSP is the digital signal processing circuit 2. The DAC is the DAC 3. The IQ modulator is the polarization multiplexed quadrature optical modulator 5. The LD is the transmission light source 8. The superimposition modulation drive circuit 7 is not depicted.

Optical multiplexers 93 and 103 multiplex and output light output from the transmitters 92 and 102 to optical transmission paths such as optical fibers. In FIG. 12, one of the transmitters 92 and 102 is depicted for each of the optical multiplexers 93 and 103. Relay nodes 94 and 104 are the optical transmission apparatus 41 acting as the relay node. A node controller 95 controls operation of a wavelength cross-connect, etc. in the relay nodes 94 and 104, for example. Optical demultiplexers 96 and 106 demultiplex the light input from the optical transmission path for each of receivers 97 and 107. In FIG. 12, one of the receivers 97 and 107 is depicted for each of the optical demultiplexers 96 and 106.

The receivers 97 and 107 are the optical transmission apparatus 71 acting as the receiving end. The receivers 97 and 107 may have an LD, a coherent receiver, an ACD, and a reception side digital signal processor (Rx-DSP). The LD is the local light source 72. The coherent receiver is the intradyne reception polarization diversity light-receiving front end 73. The ADC is the ADC 74. The Rx-DSP is the digital signal processing circuit 75. The superimposed-signal demodulation circuit 76 is not depicted.

According to the optical transmission system depicted in FIG. 12, the transmitters 92 and 102 notify the relay nodes 94 and 104 or the receivers 97 and 107 of the control process details and the control start timing through the superimposition modulation. Therefore, the transmitters 92 and 102 can control the control process details and the start timing of the control process details in the relay nodes 94 and 104 or the receivers 97 and 107. Consequently, the downtime of a given wavelength path in the optical transmission system can be minimized.

A first application example of the control timing synchronization method will be described. For example, during operation of wavelength paths in the optical transmission system depicted in FIG. 12, the wavelength paths may repeatedly be increased and decreased, resulting in fragmentation of wavelength utilization and reduction in a degree of freedom of routing of a new wavelength path. To eliminate this situation, wavelength defragmentation may be performed to change the wavelengths of the wavelength paths in operation. When the wavelengths are changed, the wavelength paths are under operation and therefore, it is desirable to make the change rapidly to prevent the wavelength paths from being down.

Therefore, it is desired to synchronize the process of changing the wavelengths at the transmitting end, the relay node, and the receiving end (e.g., Sone, Kyousuke, et al., "First Demonstration of Hitless Spectrum Defragmentation using Real-time Coherent Receivers in Flexible Grid Optical Networks", ECOC 2012, paper Th.3.D.1, Sep. 19, 2012). By performing the control timing synchronization method described above, the start timing of the process of changing wavelengths can be synchronized at the transmitting end, the relay node, and the receiving end and therefore, the downtime of the wavelength paths can be minimized.

A second application example of the control timing synchronization method will be described. For example, during operation of wavelength paths in the optical transmission system depicted in FIG. 12, for example, when another wavelength path is added or removed, the characteristics of the wavelength paths may be changed due to the nonlinear effect and the effect of interchannel crosstalk, resulting in a change of the optimum modulation mode or the error correction code. When a transmission wavelength of a wavelength path is altered, variation of the nonlinear effect or an optical signal to noise ratio (SNR) may change the characteristics of the wavelength paths, resulting in a change of the optimum modulation mode or the error correction code. If it is requested to perform delivery to a node further than before in multicast transmission, the optimum modulation mode and the error correction code may be changed.

When the modulation mode and the error correction code are changed, it is desired to execute the changing process at the transmitting end and the receiving end in a synchronized manner so as to prevent the wavelength paths in operation from being down. By performing the control timing synchronization method described above, the process of changing the modulation mode and the error correction code can be synchronized at the transmitting end and the receiving end and therefore, the downtime of the wavelength paths can be minimized. The same applies to a case of changing the bit rate of the main signal.

A third application example of the control timing synchronization method will be described. Since a digital coherent large-scale integration (LSI) has an automatic equalization function and a wavelength selection function, interception can be performed midway of an optical transmission path by preparing a receiver equipped with the LSI of the same manufacturer and the same model. To prevent interception, the same secret key may be set at the transmitting end and the receiving end to apply a scramble circuit in which the transmitting end and the receiving end are initialized at the same time. As a result, interception after the initialization can be made difficult and practically impossible.

Figure 13:
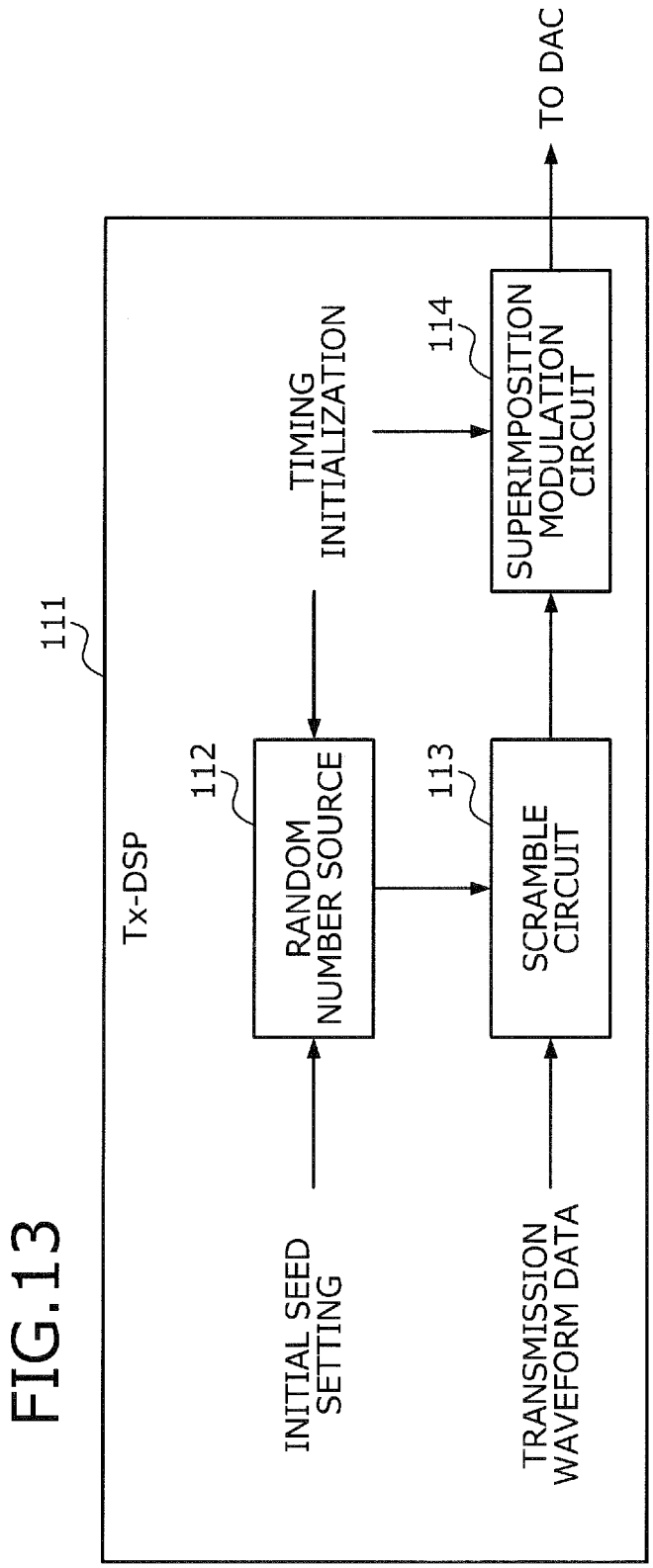
FIG. 13 is a diagram of an example of an encryption circuit at the transmitting end.

FIG. 13 is a diagram of an example of an encryption circuit at the transmitting end. As depicted in FIG. 13, in the optical transmission apparatus acting as the transmitting end, a transmission side digital signal processor (Tx-DSP) 111 may have a random number source 112, a scramble circuit 113, and a superimposition modulation circuit 114.

The random number source 112 may be a pseudo-random number source circuit generating pseudo-random numbers for a very long period, for example, a period of 25 years or longer. The Mersenne twister is an example of the random number source 112. The random number source 112 has an initial seed set by an operator of a network. The scramble circuit 113 encrypts transmission waveform data according to the output of the random number source 112. The superimposition modulation circuit 114 modulates and outputs to the DAC the encrypted signal output from the scramble circuit 113, in terms of code mapping, a phase, or polarization at a speed making the tracking by a DSP impossible.

Figure 14:
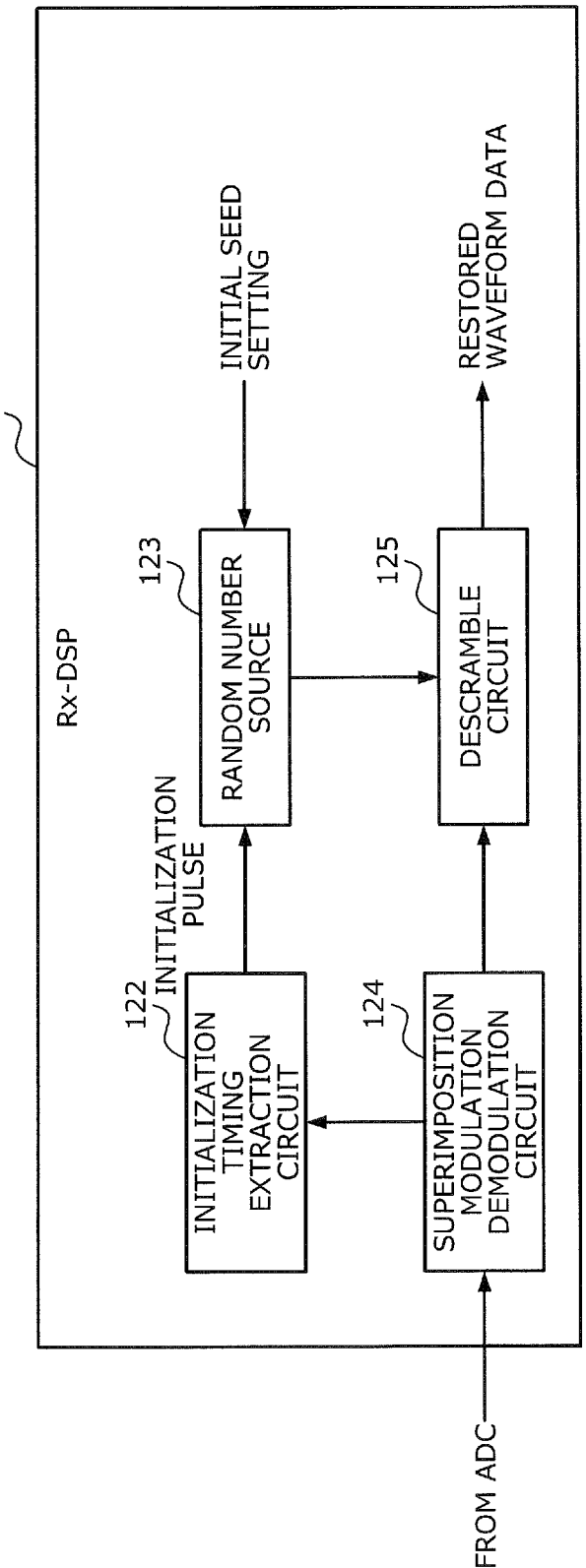
FIG. 14 is a diagram of an example of an encryption circuit at the receiving end.

FIG. 14 is a diagram of an example of an encryption circuit at the receiving end. As depicted in FIG. 14, in the optical transmission apparatus acting as the receiving end, a reception side digital signal processor (Rx-DSP) 121 may have an initialization timing extraction circuit 122, a random number source 123, a superimposition modulation demodulation circuit 124, and a descramble circuit 125.

The random number source 123 may be a pseudo-random number source circuit generating pseudo-random numbers for a very long period, for example, a period of 25 years or longer. The Mersenne twister is an example of the random number source 123. The random number source 123 has an initial seed set by the operator of the network. The random number source 123 is initialized by input of an initialization pulse to start or restart operation.

To the superimposition modulation demodulation circuit 124, a signal modulated by the superimposition modulation circuit 114 of the transmitting end is input from the ADC. The superimposition modulation demodulation circuit 124 demodulates the signal output from the ADC. The descramble circuit 125 decrypts the signal output from the superimposition modulation demodulation circuit 124 and outputs restored waveform data according to the output from the random number source 112 of the transmitting end. The initialization timing extraction circuit 122 extracts the timing of initialization from the signal output from the superimposition modulation demodulation circuit 124 and transmits the initialization pulse to the random number source 123.

The operator of the network sets the initial seeds of the same value to the random number source 112 of the transmitting end and the random number source 123 of the receiving end. When the random number source 112 and the superimposition modulation circuit 114 of the transmitting end start or restart the operation consequent to the initialization of timing, the timing of the initialization is extracted by the initialization timing extraction circuit 122 of the receiving end, and the random number source 123 of the receiving end starts or restarts the operation by the initialization pulse.

By performing the control timing synchronization method described above, the timing of starting or restarting the operation of the random number source 112 and the superimposition modulation circuit 114 of the transmitting end can be synchronized with the timing of starting or restarting the operation of the random number source 123 of the receiving end. As a result, interception can be made difficult and practically impossible.

According to the control timing synchronization method, the optical transmission system, and the optical transmission apparatus, the switching timing of the process at the transmitting end of the wavelength path can be synchronized with the switching timings of the process at the relay node and the receiving end.

All examples and conditional language provided herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A control timing synchronization method that is executed by a first optical transmission apparatus that acts as a transmitting end in a wavelength path, and a second optical transmission apparatus that receives in the wavelength path, an optical signal from the first optical transmission apparatus, the control timing synchronization method comprising:
   the first optical transmission apparatus:
   superimposing on a main signal and transmitting, information for giving notification of control process details,
   waiting for a first period after transmitting the information,
   superimposing on the main signal and transmitting after waiting for the first period, a message for giving notification of control start timing,
   waiting for a second period after transmitting the message, and
   switching after waiting for the second period, a process of the first optical transmission apparatus to a process corresponding to the control process details; and
   the second optical transmission apparatus:
   acquiring the information superimposed on the main signal and transmitted from the first optical transmission apparatus,
   waiting until detection of the message superimposed on the main signal and transmitted from the first optical transmission apparatus, when a process is present that is to be executed by the second optical transmission apparatus based on the information,
   waiting for the second period when the message is detected while waiting for the detection of the message, and
   executing after waiting for the second period, a process corresponding to the information,
   wherein the first period and the second period are predetermined.

2. The control timing synchronization method according to claim 1, wherein synchronization of a clock is established between the first optical transmission apparatus and the second optical transmission apparatus, before the first optical transmission apparatus superimposes and transmits the information on the main signal.

3. The control timing synchronization method according to claim 2, wherein the first optical transmission apparatus superimposes on the main signal and transmits to the second optical transmission apparatus, a clock of the first optical transmission apparatus or a signal capable of regenerating the clock.

4. The control timing synchronization method according to claim 1, wherein the first optical transmission apparatus superimposes the information or the message on the main signal by modulating intensity, frequency, or a polarization state of an optical signal according to the information or the message.

5. The control timing synchronization method according to claim 1, wherein
   the first optical transmission apparatus executes a process of switching a modulation mode as the process corresponding to the control process details, and
   the second optical transmission apparatus executes a process of switching a modulation mode as the process corresponding to the information.

6. The control timing synchronization method according to claim 1, wherein
   the first optical transmission apparatus executes a process of switching a transmission wavelength as the process corresponding to the control process details, and
   the second optical transmission apparatus executes a process of switching a transmission wavelength as the process corresponding to the information.

7. The control timing synchronization method according to claim 1, wherein
   the first optical transmission apparatus executes a process of switching an error correction mode of the main signal as the process corresponding to the control process details, and
   the second optical transmission apparatus executes a process of switching an error correction mode of the main signal as the process corresponding to the information.

8. The control timing synchronization method according to claim 1, wherein
   the first optical transmission apparatus executes a process of switching a bit rate of the main signal as the process corresponding to the control process details, and
   the second optical transmission apparatus executes a process of switching a bit rate of the main signal as the process corresponding to the information.

9. The control timing synchronization method according to claim 1, wherein
   the first optical transmission apparatus executes an operation of starting or restarting a scrambler of the first optical transmission apparatus as the process corresponding to the control process details, and
   the second optical transmission apparatus executes an operation of starting or restarting a scrambler of the second optical transmission apparatus as the process corresponding to the information.

10. An optical transmission system comprising:
    a first optical transmission apparatus that acts as a transmitting end in a wavelength path; and
    a second optical transmission apparatus that receives an optical signal transmitted from the first optical transmission apparatus in the wavelength path, wherein
    the first optical transmission apparatus includes a processor that is configured to:

generate a control process details notification signal giving
notification of control process details,
generate a control start timing notification signal,
wait for a predetermined period, and
set a process of the first optical transmission apparatus to a
process that corresponds to the control process details,
the first optical transmission apparatus superimposes on a
main signal and transmits, the signal giving notification
of the control process details; waits for a first period after
transmitting the control process details notification signal; superimposes on the main signal and transmits, the
control start timing notification signal after waiting for
the first period; waits for a second period after transmitting the control start timing notification signal; and after
waiting for the second period, switches a process of the
first optical transmission apparatus to the set process,
the second optical transmission apparatus includes a processor that is configured to:
acquire information for giving notification of control process details, based on the control process details notification signal superimposed and transmitted on the main
signal,
determine a presence of a process for the second optical
transmission apparatus, based on the acquired information,
wait for detection of the control start timing notification
signal superimposed and transmitted on the main signal,
wait for a predetermined period, and
set a process of the second optical transmission apparatus
to a process that corresponds to the control process
details, and
the second optical transmission apparatus acquires the
information; determines the presence of a process for the
apparatus, based on the information; waits for detection
of the control start timing notification signal, when a
process for the second optical transmission apparatus is
present; waits for the second period upon detecting the
control start timing notification signal while waiting for
detection of the control start timing notification signal,
and after waiting for the second period, sets and executes
the process that corresponds to the information,
wherein the first period and the second period are predetermined and the predetermined period is equal to the
first period or second period.

11. The optical transmission system according to claim 10, wherein before the first optical transmission apparatus superimposes on the main signal and transmits, the control process details notification signal, synchronization of a clock is established between the first optical transmission apparatus and the second optical transmission apparatus.

12. The optical transmission system according to claim 11, wherein the first optical transmission apparatus superimposes on the main signal and transmits to the second optical transmission apparatus, a clock of the first optical transmission apparatus or a signal capable of regenerating the clock.

13. An optical transmission apparatus comprising
a processor that is configured to:
generate a control process details notification signal giving
notification of control process details;
generate a control start timing notification signal;
wait for a predetermined period; and
set a process of the optical transmission apparatus to a
process corresponding to the control process details,
wherein
the optical transmission apparatus superimposes on a main
signal and transmits, the control process details notification signal; waits for a first period after transmitting
the control process details notification signal; superimposes on the main signal and transmits, the control start
timing notification signal after waiting for the first
period; waits for a second period after transmitting the
control start timing notification signal, and after waiting
for the second period, switches a process of the optical
transmission apparatus to the set process,
wherein the first period and the second period are predetermined and the predetermined period is equal to the
first period or second period.

14. The optical transmission apparatus according to claim 13, wherein the optical transmission apparatus superimposes on the main signal and transmits, a clock of the optical transmission apparatus or a signal capable of regenerating the clock.

15. The optical transmission apparatus according to claim 13, wherein the optical transmission apparatus modulates intensity, frequency, or a polarization state of an optical signal according to information or a message to superimpose the information or the message on the main signal.

16. The optical transmission apparatus according to claim 13, wherein the optical transmission apparatus executes a process of switching a modulation mode, a transmission wavelength, an error correction mode of the main signal, or a bit rate of the main signal, or an operation of starting or restarting a scrambler of the optical transmission apparatus as the process corresponding to the control process details.

* * * * *